US012750823B2

(12) United States Patent
Li et al.

(10) Patent No.: US 12,750,823 B2
(45) Date of Patent: Sep. 29, 2026

(54) METHODS AND SYSTEMS FOR COVERAGE ENHANCEMENT IN WIRELESS NETWORKS

(71) Applicant: ZTE Corporation, Shenzhen (CN)

(72) Inventors: Jian Li, Shenzhen (CN); Xianghui Han, Shenzhen (CN); Yiwei Deng, Shenzhen (CN); Peng Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 305 days.

(21) Appl. No.: 18/172,954

(22) Filed: Feb. 22, 2023

(65) Prior Publication Data

US 2023/0199735 A1 Jun. 22, 2023

Related U.S. Application Data

(63) Continuation of application No. PCT/CN2021/092726, filed on May 10, 2021.

(51) Int. Cl.

*H04W 72/00* (2023.01)
*H04W 72/0446* (2023.01)
*H04W 72/51* (2023.01)
*H04W 74/0833* (2024.01)
*H04W 74/0836* (2024.01)

(52) U.S. Cl.

CPC ....... *H04W 72/0446* (2013.01); *H04W 72/51* (2023.01); *H04W 74/0833* (2013.01); *H04W 74/0836* (2024.01)

(58) Field of Classification Search

None

See application file for complete search history.

(56) References Cited

U.S. PATENT DOCUMENTS

2020/0067676 A1* 2/2020 Yi ......................... H04W 72/23
2020/0178314 A1* 6/2020 Liu ................... H04W 72/0466
2020/0252972 A1* 8/2020 Rico Alvarino ...... H04L 5/0094
2021/0028899 A1* 1/2021 Medles ................. H04L 5/0094
2022/0061063 A1* 2/2022 Patel ................. H04W 28/0268
2022/0248405 A1* 8/2022 Ly ......................... H04L 5/0094

(Continued)

FOREIGN PATENT DOCUMENTS

CN 109997405 A 7/2019
CN 111757339 A 10/2020
CN 114793189 B * 10/2024 ......... H04L 25/0224

(Continued)

OTHER PUBLICATIONS

Office Action dated Feb. 3, 2025 for Japanese Patent Application No. 2023-568682, 4 pages.

(Continued)

*Primary Examiner* — Brandon M Renner

(74) *Attorney, Agent, or Firm* — Perkins Coie LLP

(57) ABSTRACT

Methods and systems for techniques for coverage enhancement in wireless networks are disclosed. In one example aspect, the method includes determining, by a network device, one or more time domain windows associated with time domain resources based on capability information of a wireless device, indicating, by the network device, the one or more time domain windows, and receiving, by the network device, from the wireless device, a message according to the one or more indicated time domain windows.

7 Claims, 28 Drawing Sheets

(56) References Cited

U.S. PATENT DOCUMENTS

| | | | | |
|---|---|---|---|---|
| 2023/0027316 | A1* | 1/2023 | Xu | H04L 5/0051 |
| 2023/0164773 | A1* | 5/2023 | Alfarhan | H04W 74/0833 370/329 |

FOREIGN PATENT DOCUMENTS

| | | | |
|---|---|---|---|
| EP | 4320982 | A1 | 2/2024 |
| JP | 2024-517904 | A | 4/2024 |
| WO | 2017121324 | A1 | 7/2017 |
| WO | 2020034224 | A1 | 2/2020 |

OTHER PUBLICATIONS

Sierra Wireless, Design Considerations for Joint channel estimation for PUSCH, 3GPP TSG RAN WG1 #104bis-e R1-2103460, Apr. 7, 2021, pp. 1-10.
ISA, International Search Report for International Application No. PCT/CN2021/092726, Mail Date: Jan. 29, 2022. (4 pages).
OPPO 3GPP TSG-RAN WG2 Meeting #AH 1807, Montreal Canada, R2-1809922, "Random Access Procedure for NR-U", Jul. 6, 2018.
Extended European Search Report from European Patent Application No. 21941141.0 dated Jun. 26, 2024. 9 pages.
Moderator (China Telecom), "[104-e-NR-CovEnh-03] Summary of email discussion on joint channel estimation for PUSCH," 3GPP TSG RAN WG1 Meeting #104-e E-Meeting, Jan. 25-Feb. 5, 2021, R1-2102161, 2021.
Moderator (China Telecom), "[104b-e-NR-R17-CovEnh-02] Summary of email discussion onE-Meeting, Apr. 12-20, 2021 joint channel estimation for PUSCH," 3GPP TSG RAN WG1 Meeting #104bis-e, R1-2104006, 2021.
JPO, Final Office Action for Japanese Application No. 2023-568682, mailed on Aug. 6, 2025, 8 pages with unofficial English translation.
MOIP, Office Action for Korean Application No. 10-2023-7038833, mailed on Dec. 24, 2025, 8 pages with unofficial English translation.
CNIPA, Office Action for Chinese Application No. 202180055537.6, mailed on Jul. 15, 2026, 22 pages with unofficial English translation.

* cited by examiner

FIG. 20
2 step RACH
Legacy RSRP threshold for 2 step RACH (msgA-RSRP-Threshold)
4 step RACH, w/o requesting Msg3 repetition
Legacy RSRP threshold for requesting Msg3 without repetition (rsrp-ThresholdSSB)
4 step RACH, w/o requesting Msg3 repetition
New RSRP threshold for requesting Msg3 with repetition
4 step RACH, w/ requesting Msg3 repetition

METHODS AND SYSTEMS FOR COVERAGE ENHANCEMENT IN WIRELESS NETWORKS

CROSS REFERENCE TO RELATED APPLICATIONS

This patent document is a continuation of and claims benefit of priority to International Patent Application No. PCT/CN2021/092726, filed on May 10, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for configuring a time domain window that includes at least one of a time domain window size or a starting point of a time domain window in mobile communication technology.

In one aspect, a method of data communication is disclosed. The method includes determining, by a network device, one or more time domain windows associated with time domain resources based on capability information of a wireless device, indicating, by the network device, the one or more time domain windows, and receiving, by the network device, from the wireless device, a message according to the one or more indicated time domain windows.

In another aspect, a method of data communication is disclosed. The method includes configuring, by a network device, a time domain window of a time domain resource for joint channel estimation for a wireless device, configuring, by the network device, a starting point of the time domain window, and receiving, by the network device, from the wireless device, a message according to the starting point of the time domain window.

In another aspect, a method of data communication is disclosed. The method includes transmitting, by a wireless device, to a network device, capability information for determining time domain windows associated with time domain resources, receiving, by the wireless device, from the network device, an indication of one or more time domain windows, and transmitting, by the wireless device, a message according to the one or more time domain windows.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Figure 1A:
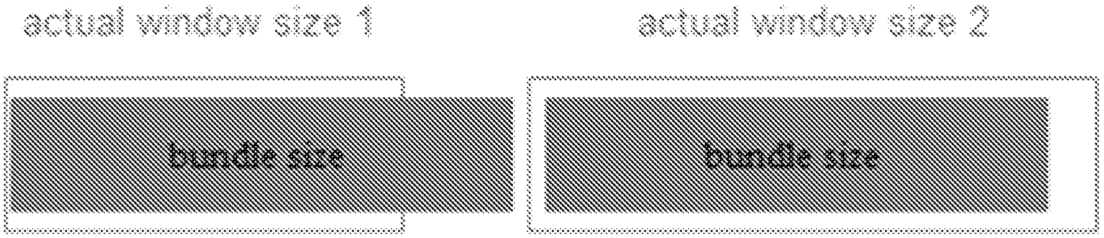
FIGS. 1A-1C show examples of actual window sides and bundle sizes.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems In the RAN plenary meeting, a new NR (New Radio) coverage enhancement scheme was approved, but there are still some coverage bottlenecks. For example, a physical uplink shared channel (PUSCH) is a potential coverage bottleneck channel. The disclosed technology can be implemented in some embodiments to provide coverage enhancement mechanisms for PUSCH.

In a recent meeting for RAN, a joint channel estimation for PUSCH coverage enhancement was discussed, and the following agreements were reached. In addition to the recent agreements, the disclosed technology can be implemented in some embodiments to determine the relationships between a user equipment (UE) capability, the bundle size (e.g., time domain hopping interval) and the time domain window size.

Agreements: For a joint channel estimation, there will be specified time domain windows during which a UE is expected to maintain power consistency and phase continuity among PUSCH transmissions subject to power consistency and phase continuity requirements.

In this regard, the disclosed technology can be implemented in some embodiments to determine the time domain window (e.g., via explicit configuration and/or implicitly derived) and the possibility of enabling/disabling the time domain window. The disclosed technology can also be implemented in some embodiments to determine the units of the time domain window (e.g., repetitions, slots, and/or symbols), and the association between the potential use case(s) and the units of the time domain window.

The disclosed technology can also be implemented in some embodiments to determine single or multiple time domain windows, the relation with UE capability, the impact of timing advance.

Agreements: For inter-slot frequency hopping with inter-slot bundling, at least one of the following options can be selected.

Option 1: The bundle size (time domain hopping interval) equals to the time domain window size.

Option 2: The bundle size (time domain hopping interval) can be different from the time domain window size.

In this regard, the disclosed technology can be implemented in some embodiments to determine whether to explicitly configure or implicitly determine the bundle size (e.g., time domain hopping interval), whether and how to define the bundle size (e.g., time domain hopping interval) separately for frequency division duplex (FDD) and time division duplex (TDD), the relationship between the bundle size (e.g., time domain hopping interval) and the time domain window size.

Agreements: For the time domain window for joint channel estimation, at least one of the following options can be selected.

Option 1: The unit of the time domain window is defined separately for the following PUSCH transmissions: PUSCH repetition type A; PUSCH repetition type B, if agreed; TBoMS (TB over multi-slots), if agreed; and different transport block (TB), if agreed.

Option 2: The unit of the time domain window is the same for the following PUSCH transmission: PUSCH repetition type A; PUSCH repetition type B, if agreed, TBoMS, if agreed; and different TB, if agreed.

Coverage is one of the key factors that an operator considers when commercializing cellular communication networks due to its direct impact on service quality, capital expenditures, and operating expenses. Despite the importance of coverage on the success of NR commercialization, a thorough coverage evaluation and a comparison with legacy radio access technologies (RATs) considering all NR specification details have not been done up to now.

Among physical channels, physical uplink shared channel (PUSCH) and physical uplink control channel (PUCCH) are potential coverage bottleneck channels, and corresponding enhancements are needed. For PUSCH transmission, joint channel estimation and inter-slot hopping with inter-slot bundling are proposed as ways for coverage enhancement. For channel estimation within multiple slot or repetition occasion, the phase continuity and power consistency should be maintained. RAN4 confirms the feasibility of phase continuity and power consistency for non-zero un-scheduled gap case for a gap less than 14 symbols when UE is not required to meet the existing off power requirements. Whether to introduce new off power requirements for shorter duration than 1 ms as well as the maximum value of X un-scheduled symbols are under discussions. As for other UL channels in between repetitions, at least if the other scheduled signals/channels during the non-zero gap have the same settings in an antenna port, occupied PRBs and UL power, it is feasible to maintain the phase continuity and power consistency across the repetitions. However, how to design a time domain window for maintaining the phase continuity is under discussion. The disclosed technology can be implemented in some embodiments to provide systems and methods for the time domain window.

Msg3 PUSCH repetition has been identified to provide coverage enhancement. However, new mechanisms are needed to differentiate between RACH procedure without Msg3 PUSCH repetition and RACH procedure with Msg3 PUSCH repetition. In addition, the number of repetitions for Msg3 PUSCH can be counted by available slots. Thus, new mechanisms are also needed to determine whether a slot is an available slot for Msg3 PUSCH repetition.

Scheme 1

Figure 1B:
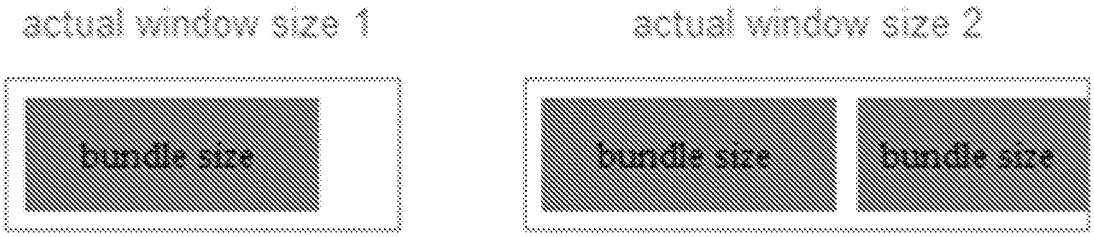
Figure 1C:
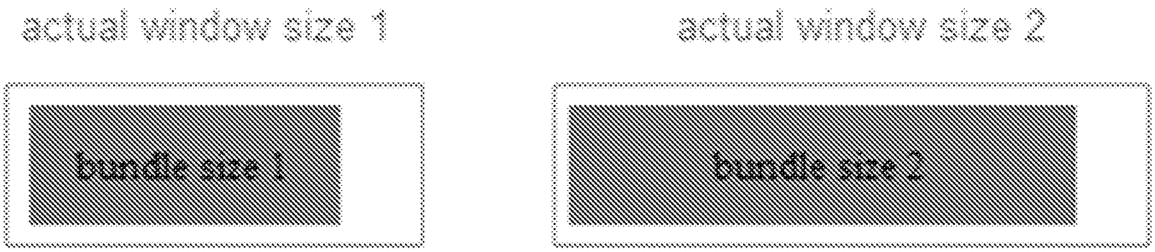

FIGS. 1A-1C show examples of actual window sides and bundle sizes.

The disclosed technology can be implemented in some embodiments to configure three sizes: a nominal time domain window size, an actual time domain window size and a bundle size. Here, the size indicates time domain resources and includes at least one of the following: repetition, slot, and symbol.

In some implementations, UE reports a UE capability, indicating the maximum supported time domain window size for maintaining the power consistency and phase continuity among PUSCH transmissions subject to power consistency and phase continuity requirements.

In some implementations, gNB configures a nominal time domain window size based on the UE capability report by the UE, indicating that it is a window with consecutive time domain resources, and the nominal domain window size is less than or equal to the maximum time domain window size of the UE capability feedback.

In some implementations, due to the TDD frame structure, the actual available UL slot is limited. The gNB can be further configured with the actual time domain window size, which is based on the TDD frame structure and/or conflicts with other services. One or more actual time domain windows (e.g., 2 actual windows) can be configured.

In one implementation, a frequency hopping is performed based on the configured actual time domain window size without additional configurations of the bundle size.

In another implementation, the bundle size is further configured in the actual time domain window, and the bundle size should be less than or equal to the corresponding actual time domain window size.

In one example, two actual time domain windows are configured with different window sizes. If only one bundle size is configured, the bundle size may be based on a larger actual time domain window size configuration, but the actual time domain resources available in the bundle size (including at least one of repetition, slot, or symbol) is also limited by the actual time domain window size, as shown in FIG. 1A.

In another example, if two actual time domain windows are configured and the window sizes are different, and if only one bundle size is configured, the bundle size may be based on a smaller actual time domain window size configuration, as shown in FIG. 1B. One bundle size is considered one hop, and there can be more hops. The actual available time domain resources in the third bundle size (including at least one of repetition, slot, or symbol) may still be limited by the actual time domain window size. The actual hop number or bundle size need not be split according to the actual time domain window size, which is equivalent to splitting into more hop numbers or bundle size numbers.

In another example, if two actual time domain windows are configured, and if two bundle sizes are configured, the actual time domain window size and the bundle size can be different respectively as shown in FIG. 1C. There is a corresponding relationship between the time domain window and the bundle size, and the bundle size should be less than or equal to the corresponding actual time domain window size.

In some implementations, the actual time domain window size and the bundle size are less than or equal to the nominal time domain window size.

In some implementations, UE cannot guarantee that the phase is consecutive outside the boundary of the nominal time domain window, or gNB does not expect the phase to be consecutive outside the boundary of the nominal time domain window In some implementations, the time domain window size and the bundle size can be notified in at least one of the following ways: RRC, MAC-CE and DCI;

Further, when the notification method is DCI, it can be indicated by the time domain resource allocation table.

Scheme 2

The disclosed technology can be implemented in some embodiments to configure only two sizes: nominal time domain window size and bundle size. Actual time domain window size is not configured.

In some implementations, UE reports a UE capability, indicating the maximum supported time domain window size for maintaining the power consistency and phase continuity among PUSCH transmissions subject to power consistency and phase continuity requirements.

In some implementations, gNB configures a nominal time domain window size based on the UE capability report by the UE, indicating that it is a consecutive window, and the nominal time domain window size is less than or equal to the maximum time domain window size of the UE capability feedback.

In some implementations, UE cannot guarantee that the phase is consecutive outside the boundary of the nominal time domain window, or gNB does not expect the phase to be consecutive outside the boundary of the nominal time domain window.

In some implementations, there is a corresponding relationship between the bundle size and the nominal time domain window size, for example, the bundle size is ½ of the nominal window size.

In some implementations, UE determines the actual time domain window size in the nominal time domain window according to at least one of the following: consecutive PUSCH transmission (TDD frame structure, etc.); the frequency domain resource RB occupied by PUSCH does not change; PUSCH phase continuity remains unchanged; PUSCH power control parameters will not change; PUSCH timing advance remains unchanged; PUSCH transmission precoding remains unchanged; CA Uplink switching does not perform dynamic switching; BWP does not dynamically switch; NUL/SUL does not dynamically switch; the physical non-consecutive time domain length is not greater than K; K is configurable or predefined; for example, when the time domain length is a symbol, K can be 14; if it is a time slot, it can be N time slots, N>=1, if yes In absolute time, it can be M milliseconds, M>0.

In some implementations, UE performs frequency hopping in the determined actual time domain window according to the configured bundle size.

In some implementations, the bundle size is less than or equal to the nominal time domain window size.

In some implementations, the time domain windows size and the bundle size can be notified in at least one of the following ways: RRC, MAC-CE and DCI.

In some implementations, when the notification method is DCI, it can be indicated by the time domain resource allocation table.

Scheme 3

The disclosed technology can be implemented in some embodiments to configure only one size: nominal time domain window size. Actual time domain window size and bundle size are not configured.

In some implementations, UE reports a UE capability, indicating the maximum supported time domain window size for maintain power consistency and phase continuity among PUSCH transmissions subject to power consistency and phase continuity requirements.

In some implementations, gNB configures a nominal time domain window based on the UE capability reported by the UE, indicating that it is a consecutive window, and the nominal time domain window size is less than or equal to the maximum time domain window size of the UE capability report.

In some implementations, hopping techniques can be used. In one example, the nominal time domain window can be configured with a smaller size, and the nominal time domain window is used as a bundle for frequency hopping, e.g., frequency hopping between nominal time domain windows.

In some implementations, the time domain windows size and the bundle size can be notified in at least one of the following ways: RRC, MAC-CE and DCI.

In some implementations, when the notification method is DCI, it can be indicated by the time domain resource allocation table.

Scheme 4

The disclosed technology can be implemented in some embodiments to determine a starting point of a time domain window. In this regard, at least one of the following schemes can be used.

In some implementations, UE receives the time domain position of UL Grant. For example, the time domain position of UL Grant may be based on a condition of the last symbol of UL Grant.

In some implementations, UL Grant indicates the starting time domain position of scheduling PUSCH.

In some implementations, the starting time domain position of the actual PUSCH is transmitted. In one example, an effective starting time domain position of the PUSCH, such as the time domain position according to the TDD frame structure or the conflict situation, may be transmitted.

In some implementations, if there is an interruption point in a window, the window is restarted.

In some implementations, when at least one of the following situations occurs, the window is restarted: consecutive PUSCH transmission; non-consecutive PUSCH transmission (TDD frame structure, etc.); the frequency domain resource RB occupied by PUSCH changes; the PUSCH phase continuity has changed; PUSCH power control parameters have changed; the PUSCH timing advance has changed; the PUSCH transmission precoding has changed; CA Uplink switching performs dynamic switching; BWP is dynamically switched; NUL/SUL is dynamically switched; physically no consecutive time domain length is greater than K; K is configurable or predefined; for example, when the time domain length is a symbol, K can be 14.

In some implementations, slidable windows are configured, for example, by configuring an offset.

In some implementations, the window can be at least one of a nominal time domain window or an actual time domain window.

Scheme 5

If PUSCH repetition Type B as described in clause 6.1 of [6, TS38.214] is applied to a physical channel, the UE transmission shall be such that the channel over which a symbol on the antenna port used for uplink transmission is conveyed can be inferred from the channel over which another symbol on the same antenna port is conveyed if the two symbols correspond to the same actual repetition of a PUSCH transmission with repetition Type B.

For a time-domain window (TDW), joint channel estimation can be performed in the time domain window, and the disclosed technology can be implemented in some embodiments as discussed below.

If PUSCH repetition Type A/Type B is applied to a physical channel, the UE transmission shall be such that the channel over which a symbol on the antenna port used for uplink transmission is conveyed can be inferred from the channel over which another symbol on the same antenna port is conveyed if the two symbols correspond to the same TDW of PUSCH transmissions with repetition Type A/Type B.

Embodiment 1

For joint channel estimation, inter-slot bundling, and inter-slot hopping, UE reports a maximum time domain window size used for maintaining the power consistency and phase continuity among PUSCH/PUCCH transmissions subject to power consistency and phase continuity requirements to gNB, and gNB configures at least one of the following parameters for UE: nominal time domain window; one or more bundles; one or more actual time domain windows.

In some implementations, the nominal time domain window, the one or more actual time domain windows and the one or more bundles may include a number of repetitions, a number of slots and/or a number of symbols. In addition, the nominal time domain window size is not larger than the maximum time domain window size supported by UE, and a bundle may be regarded as a hop. In some embodiments, the time resources for a bundle may be consecutive slots or non-consecutive slots (repetitions). In some embodiments, the nominal time domain window, one or more actual time domain windows and one or more bundles can be indicated by Radio Resource Control (RRC) signaling, Medium Access Control Element (MAC-CE) or Downlink Control Information (DCI). Furthermore, the nominal time domain window size, actual time domain window size and bundle size may be associated with a joint coding with Time Domain Resource Allocation (TDRA). In some embodiments, the time domain windows size or bundle size is included as one column in the TDRA. In some embodiments, the actual time domain window size and bundle size are not larger than the nominal time domain window size. In some embodiments, the bundle size is not larger than the actual time domain window size. In some embodiments, gNB does not expect the phase continuity outside the nominal time domain window boundary. In some embodiments, UE may not maintain the phase continuity outside the nominal time domain window boundary.

In some embodiments, nominal time domain windows arranged back-to-back in the time domain.

In some embodiments, an actual time domain window size is determined based on available slots and/or symbols for PUSCH, PUCCH, and/or Msg3 transmissions. In some embodiments, an actual time domain window size is determined based on a time duration during which conditions for maintaining phase continuity are satisfied.

In some embodiments, an actual time domain window size is determined based on at least one of the following factors: nominal time domain window; TDD configuration; invalid symbols for corresponding transmissions; a gap between two transmissions.

In some embodiments, UE reports multiple time domain window sizes, and each time domain window size corresponds to one specific condition. For instance, UE reports one time domain window size for UE processing capability 1 and reports another time domain window for UE processing capability 2. As another example, UE reports different time domain window sizes for PUSCH with different priorities.

In some embodiments, UE reports different time domain window sizes for different use cases. For instance, UE reports a specific time domain window size for PUSCH transmissions, and a specific time domain window size for PUCCH transmissions. Alternatively, UE reports a specific time domain window size for PUSCH transmissions with the same TB, including PUSCH repetitions and TB processing over multiple slots, and one time domain window size for PUSCH with different TBs. Alternatively, UE reports one time domain window size for PUSCH repetitions, TB processing over multiple slots and PUSCH with different TBs respectively.

In some embodiments, the UE capability reporting discussed above may also apply to Msg3 repetitions. In some embodiments, the time domain window size for Msg3 repetition is determined based on some predefined rules or implicitly determined by the transmission characteristics. In some embodiments, the transmission characteristics include at least one of the number of repetitions, the number of symbols per repetition and TDD configuration.

Figure 2A:
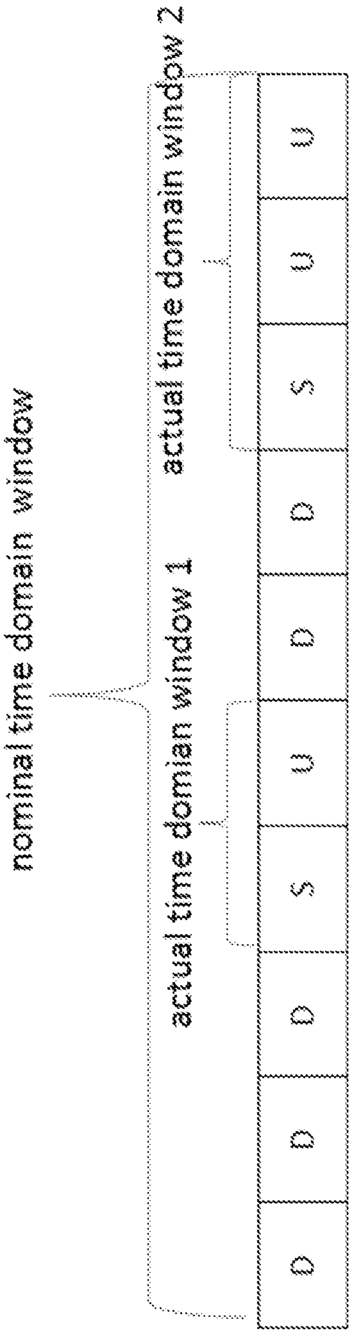
FIGS. 2A-2B shows the relationship between a frame structure, a nominal time domain window and actual time domain windows.
Figure 2B:
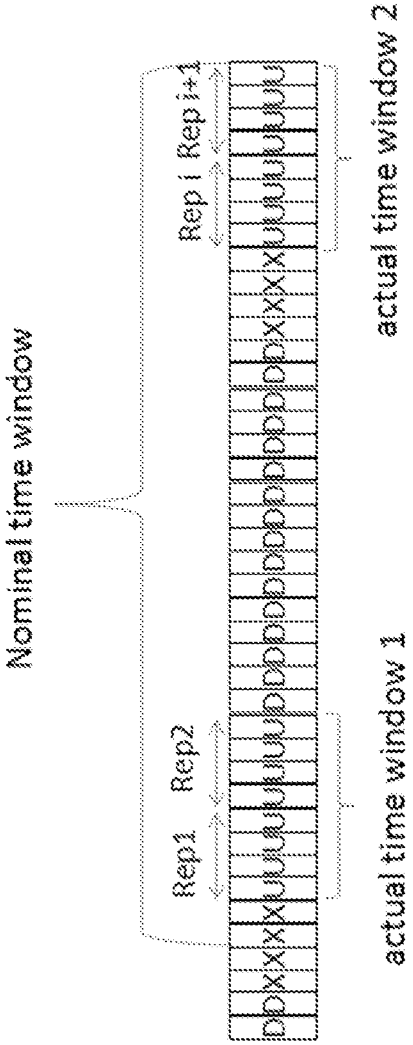

FIGS. 2A-2B shows the relationship between a frame structure, a nominal time domain window and actual time domain windows.

In some embodiments, the actual consecutive time resources for UE transmission is limited due to TDD frame structure or collision with other channel transmissions. In this case, one or more bundle sizes based on the frame structure may be configured.

In one example, the nominal time domain window size is 10 slots, and the frame structure is DDDSUDDSUU, where D is defined as a downlink (DL) slot, S is defined as a special slot which include DL, X, UL symbols, and U is defined as an uplink (UL) slot. There are less than 4 consecutive UL slots for PUSCH/PUCCH transmissions, and two actual time domain window sizes can be configured or determined where one actual time domain window includes 2 slots and another actual time domain window includes 3 slots, as show in FIG. 2A.

In another example, the nominal time domain window size is 9 repetitions (each repetition includes 4 symbols), and there are no 9 consecutive UL repetitions for PUSCH/PUCCH transmissions. Two actual time domain windows should be configured, and both actual time domain window have the sizes of 2 repetitions or 8 symbols, as show in FIG. 2B.

Figure 3:
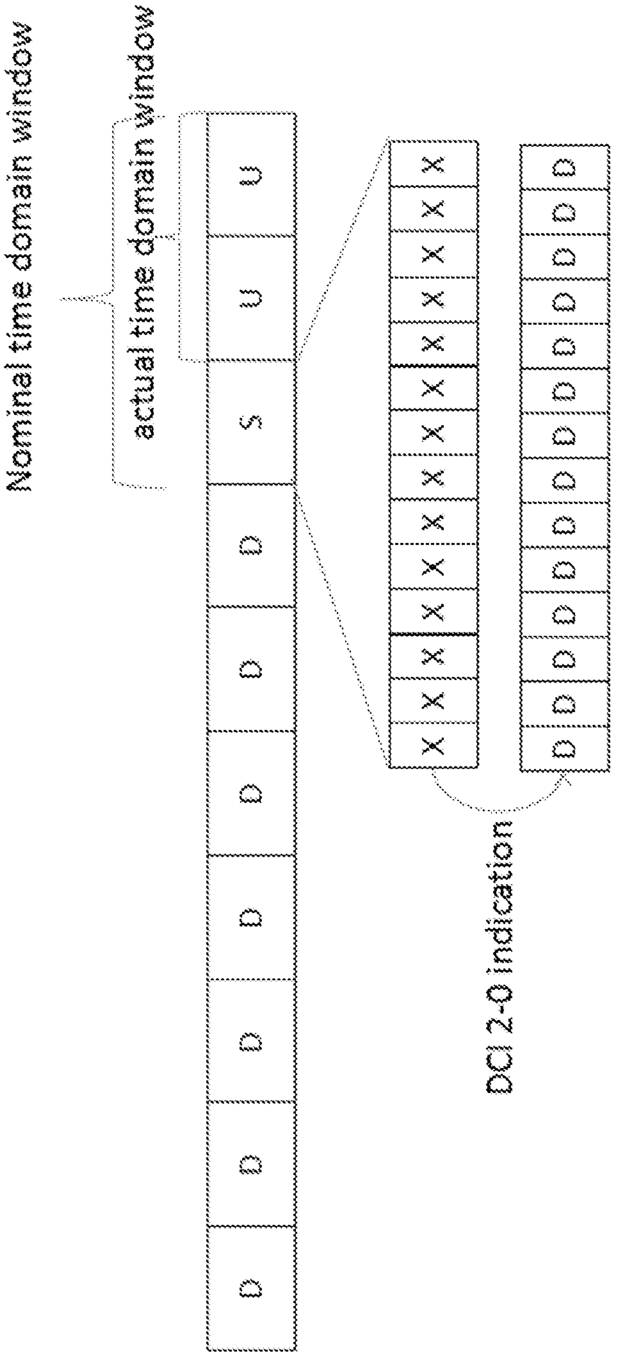
FIG. 3 shows the relationship between a frame structure, a nominal time domain window and an actual time domain window.

FIG. 3 shows the relationship between a frame structure, a nominal time domain window and an actual time domain window.

In one example, the nominal time domain window size is 3 slots, and the frame structure is DDDDDDDSUU, where D is defined as a DL slot, S is defined as a special slot which only includes X symbols, and U is defined as a UL slot. When X symbols within S slot are overridden by DL symbols by SFI (Slot Format Indicator) within DCI format 2-0 (the slot formats are defined in TS 38.213), there are no 3 consecutive UL slots for PUSCH/PUCCH transmissions, and an actual time domain window size should be configured and the actual time domain window size is 2 slots, as show in FIG. 3.

Figure 4:
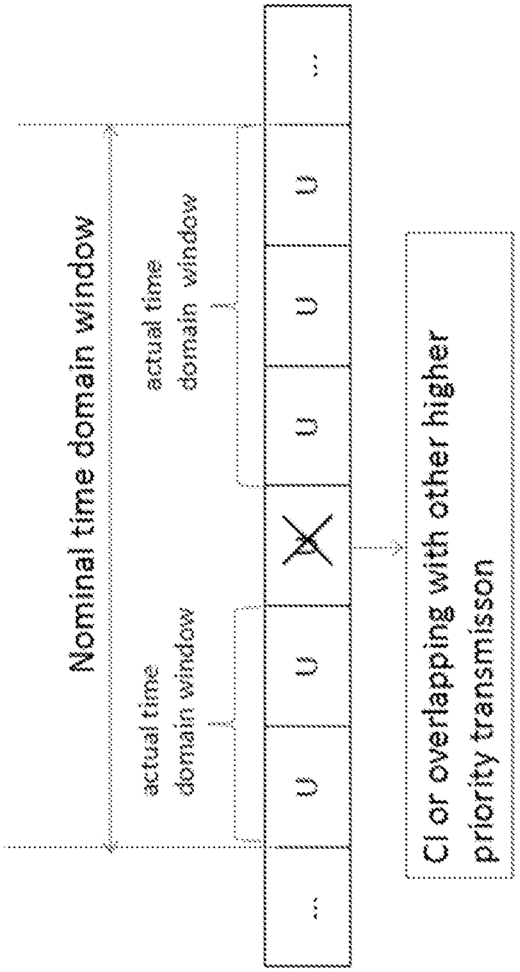
FIG. 4 shows the relationship between a collision, a nominal time domain window and an actual time domain window.

FIG. 4 shows the relationship between a collision, a nominal time domain window and an actual time domain window.

In one example, the nominal time domain window size is 6 slots, and when the PUSCH transmissions are collided with other channels transmissions (e.g., one or more PUCCH repetitions, higher-priority transmissions are overlapped with PUSCH transmissions or receive a CI signaling), and one or more slots may not be used for PUSCH transmissions within the nominal time domain window size. Two actual time domain window sizes should be configured, and one actual time domain window size is 2 slots and another actual time domain window size is 3 slots, as show in FIG. 4.

Figure 5:
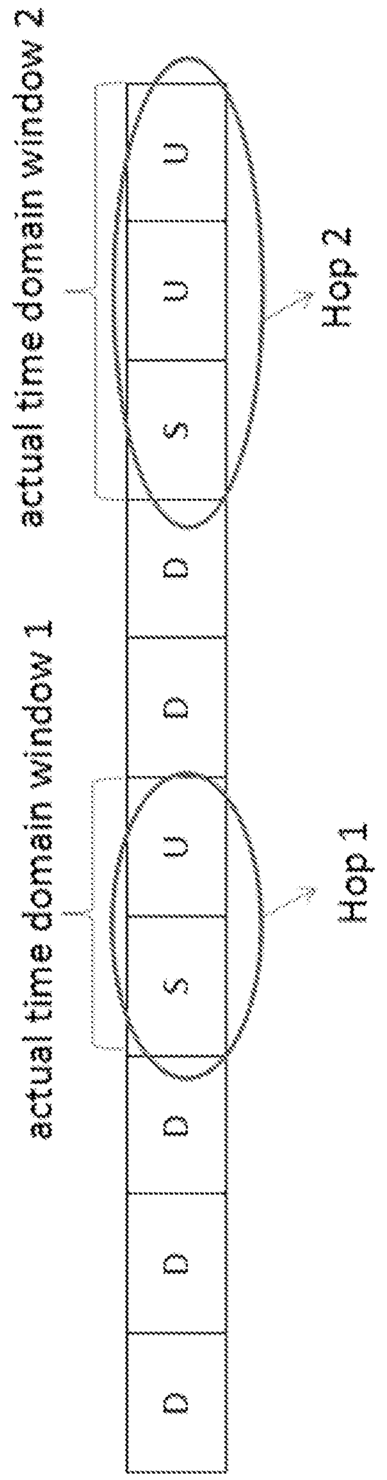
FIG. 5 shows the relationship between a hop and an actual time domain window.

FIG. 5 shows the relationship between a hop and an actual time domain window.

In some embodiments, gNB configures a nominal time domain window size and one or more actual time domain window sizes for UE and UE procedure hopping based on the one or more actual time domain window sizes. In this case, an actual bundle size is equal to the one or more actual time domain window sizes. In the case of PUSCH type A repetition, a nominal time domain window size (10 slots) and two actual time domain window sizes (actual time domain window size 1 is 2 slots and size 2 is 3 slots) are configured. The frame structure is DDDSUDDSUU, the number of repetitions is 8, the inter-slot hopping is enabled, and the inter-slot hopping has a pattern as showed in FIG. 5.

Figure 6:
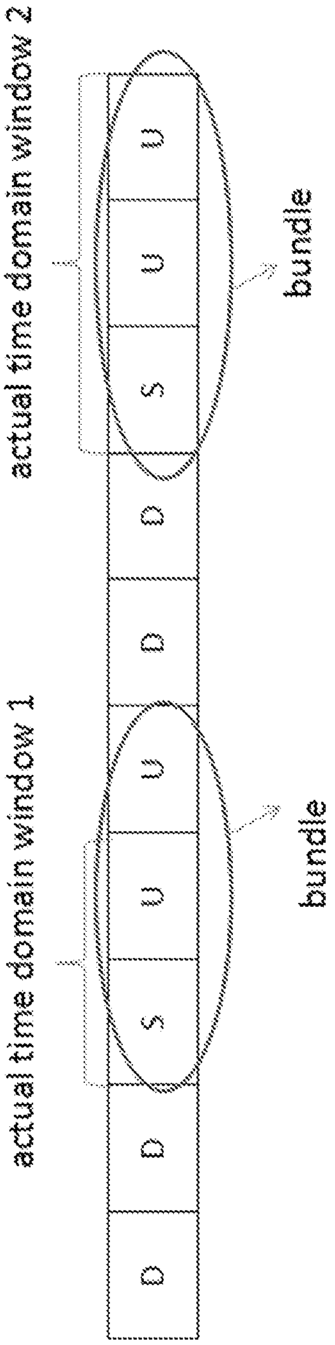
FIG. 6 shows the relationship between an actual time domain window and a bundle or hop.

FIG. 6 shows the relationship between an actual time domain window and a bundle or hop.

In some embodiments, gNB configures a nominal time domain window size, one or more actual time domain window sizes and a bundle size for UE. The bundle size may be configured based on a larger actual time domain window size. For instance, the nominal time domain window size is 10 slots, and two actual time domain window sizes are configured (actual time size 1 is 2 slots and actual time domain window size 2 is 3 slots). The bundle size is 3 slots, as show in FIG. 6.

Figure 7:
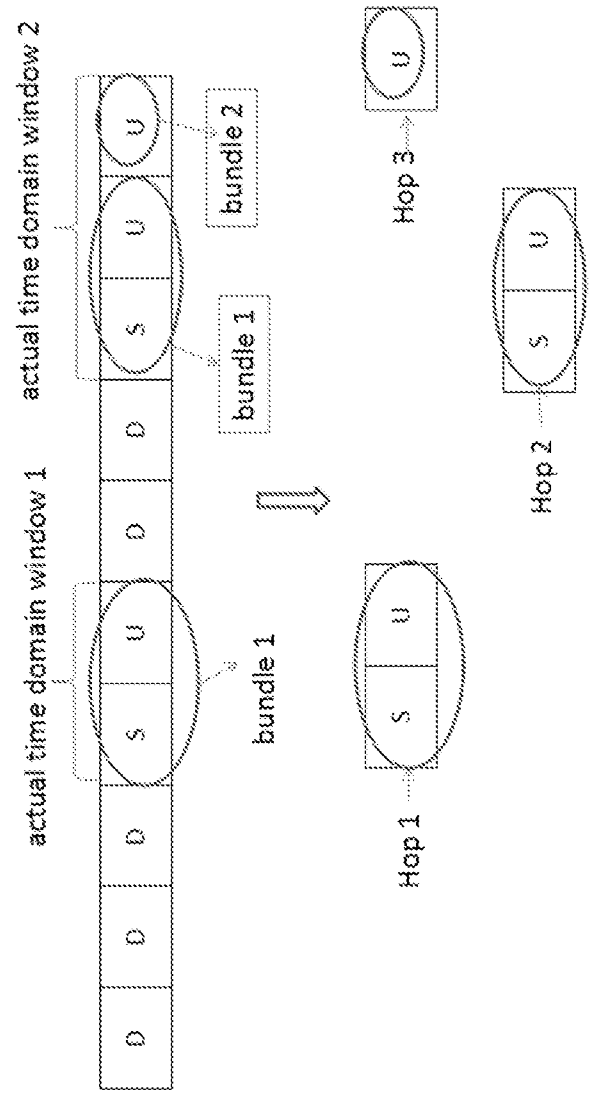
FIG. 7 shows the relationship between an actual time domain window and a bundle or hop.

FIG. 7 shows the relationship between an actual time domain window and a bundle size or hop.

In some embodiments, gNB configure a nominal time domain window size, one or more actual time domain window sizes and a bundle size for UE. The bundle size may be configured based on a smaller actual time domain window size, and a larger actual time domain window size may be split into more than one bundle size.

The bundle may be configured or determined based on the smaller actual time domain window size, and the larger actual time domain window may be split into more than one bundle.

For instance, the nominal time domain window size is 10 slots, and two actual time domain window sizes are configured (actual time size 1 is 2 and actual time domain window size 2 is 3 slots). The bundle size is 2 slots within the actual time domain window size 1, and two bundle sizes in the actual time domain window size 2 should be obtained. One bundle size is 2 slots and another bundle size is 1 slot, as show in FIG. 7.

Figure 8:
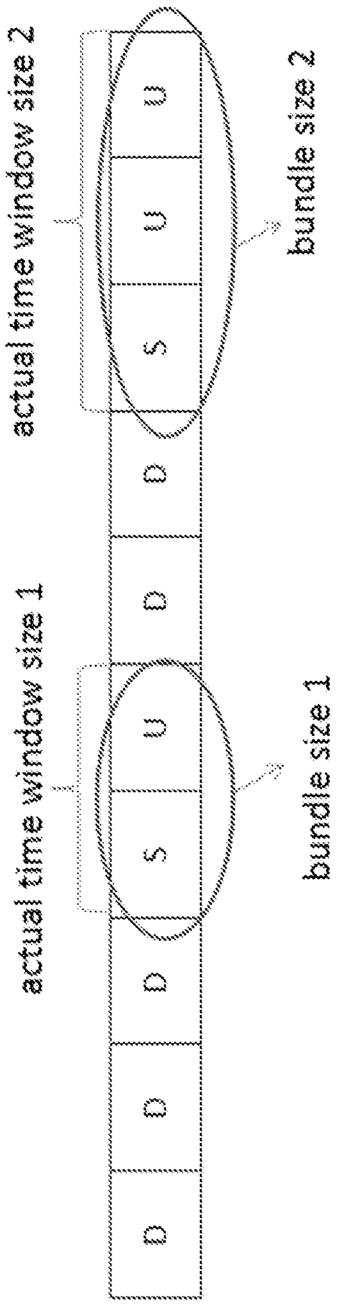
FIG. 8 shows the relationship between an actual time domain window and a bundle.

FIG. 8 shows the relationship between an actual time domain window and a bundle.

In some embodiments, gNB configures a nominal time domain window size, one or more actual time domain window sizes and one or more bundle sizes for UE, and there is a relationship between the one or more actual time domain window sizes and the one or more bundle sizes (e.g., bundle size 1 is related to actual time domain window size 1, and bundle size 2 is related to actual time domain window size 2, or bundle size 1 is related to actual time domain window size 2, and bundle size 2 is related to actual time domain window size 1). The bundle size may be configured based on its relationship with the actual time domain window size. For instance, the nominal time domain window size is 10 slots, and two actual time domain window sizes are configured (actual time size 1 is 2 and actual time domain window size 2 is 3 slots). The bundle size 1 is related to the actual time domain window size 1, and the bundle size 2 is related to the actual time domain window size 2. The bundle size may be configured such that the bundle size 1 is 2 slots and the bundle size 2 is 3 slots, as show in FIG. 8.

In some embodiments, if the S slot is not an available UL slot, the actual time domain window cannot include it.

In some embodiments, the scheme can be used for all use cases of PUSCH repetitions: Use case 1 (back-to-back PUSCH transmissions within one slot); Use case 2 (non-back-to-back PUSCH transmissions within one slot); Use case 3 (back-to-back PUSCH transmissions across consecutive slots); Use case 4 (non-back-to-back PUSCH transmissions across consecutive slots); Use case 5 (PUSCH transmissions across non-consecutive slots).

In some embodiments, the actual time domain window during which UE can maintain the phase continuity may be different for different use cases. For example, the actual time domain window may be smaller than the configured time domain window due to a collision with DL symbols in TDD operation.

In some embodiments, gNB can configure a nominal time domain window which is the same for all use cases supported. The actual time domain window(s) could be different for different cases, e.g., a group of consecutive slots/symbols or a group of PUSCHs during which the phase continuity can be actually kept.

In some embodiments, the scheme above can be used for PUSCH transmissions for one TB processed over consecutive slots.

In some embodiments, if the bundle size is larger than the actual time domain window size, the frequency hopping is based on the actual time domain window size; otherwise, the hopping is based on the bundle size.

In some embodiments, the bundle size can be implicitly determined based on the number of repetitions K within one actual time domain window or nominal time domain window, e.g., floor (K/2) or cell (K/2).

In some embodiments, for TDD cases, the bundle size may be the same as the actual time domain window size.

In some embodiments, the inter-slot bundle size for inter-slot frequency hopping is no larger than the actual time domain window size or nominal time domain window size.

In some embodiments, the scheme above can be used for PUCCH. The configured nominal time domain window size, actual time domain window sizes and bundle size can also be used for PUCCH. In some embodiments, gNB configures a nominal time domain window size, one or more actual time domain window sizes and a bundle size for PUCCH for UE separately. In this case, the nominal time domain window size, actual time domain window size and bundle size are different between PUCCH and PUSCH.

For type B PUSCH repetitions, the above methods are reused.

Embodiment 2

Figure 9:
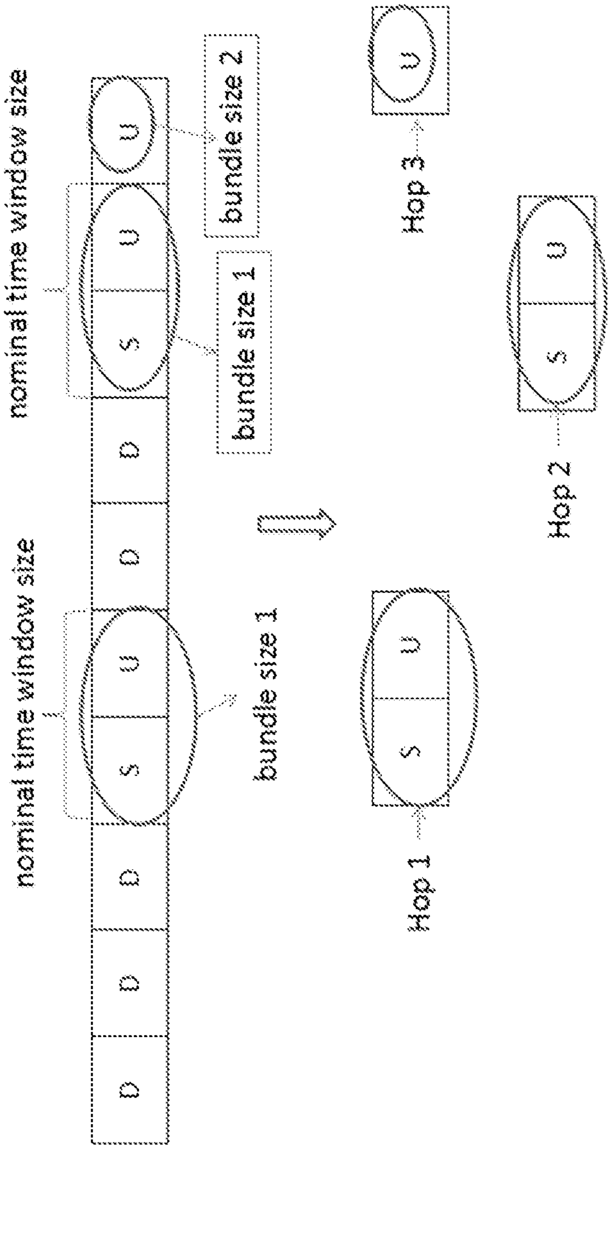
FIG. 9 shows the relationship between a nominal time domain window and a bundle or hop.

FIG. 9 shows the relationship between a nominal time domain window and a bundle or hop.

For joint channel estimation and inter-slot bundling hopping, UE reports a maximum time domain window size used for maintaining the power consistency and phase continuity among PUSCH/PUCCH transmissions subject to power consistency and phase continuity requirements to gNB. The gNB configures at least one of the following parameters for UE: nominal time domain window; one or more bundle.

In some implementations, the time domain window includes at least one of a time domain window size or a starting point of the time domain window.

In some implementations, the nominal time domain window size and the one or more bundle sizes may include a number of repetitions, a number of slots and/or a number of symbols. In addition, the nominal time domain window size is not be larger than the maximum time domain window size supported by UE, and a bundle may be regarded as a hop. In some embodiments, the time resources for a bundle may be consecutive or non-consecutive slots (repetitions). In some embodiments, the nominal time domain window and the bundle can be indicated by RRC signaling, MAC-CE or DCI. Furthermore, the windows size and bundle size may be determined by a joint coding with TDRA if indicated by DCI. In some embodiments, the time domain window size or bundle size is included as one column in the TDRA. In some embodiments, the bundle size is not larger than nominal time domain window size. In some embodiments, gNB does not expect phase continuity outside the nominal time domain window boundary. In some embodiments, UE may not maintain the phase continuity outside the nominal time domain window boundary. In some embodiments, there is a relationship between the nominal time domain window and the bundle size, e.g., the bundle size is equal to 1/N of the nominal time domain window size, where N is an integer and not smaller than 1.

In some embodiments, the actual time domain window size may be determined within a nominal time domain window size based at least on one of the following conditions: PUSCH transmission on consecutive resources; resource blocks (RBs) occupying PUSCH transmissions are not changed; the phase continuity for PUSCH transmission is not changed; the power control parameters for PUSCH transmission are not changed; the timing advance parameters for PUSCH transmission are not changed; the TPMI (Transmission Precoding Matrix Index) for PUSCH transmission is not changed; no dynamic uplink switching in CA scenario; no dynamic bandwidth part (BWP) switching; no dynamic switching between NUL and SUL; physical non-consecutive time resource should not be larger than a threshold value of K, where the value of K is configurable or pre-defined and the value of K includes a number of symbols or slots or repetitions or ms.

In some embodiments, nominal time domain windows arranged back-to-back in the time domain.

In some embodiments, an actual time domain window size is determined based on available slots and/or symbols for PUSCH, PUCCH, and/or Msg3 transmissions. In some embodiments, an actual time domain window size is determined based on a time duration during which conditions for maintaining phase continuity are satisfied.

In some embodiments, an actual time domain window size is determined based on at least one of the following factors: nominal time domain window; TDD configuration; invalid symbols for corresponding transmissions; a gap between two transmissions.

In some embodiments, UE reports multiple time domain window sizes, and each time domain window size corresponds to one specific condition. For instance, UE reports one time domain window size for UE processing capability 1 and reports another time domain window for UE processing capability 2. As another example, UE reports different time domain window sizes for PUSCH with different priorities.

In some embodiments, UE reports different time domain window sizes for different use cases. For instance, UE reports a specific time domain window size for PUSCH transmissions, and a specific time domain window size for PUCCH transmissions. Alternatively, UE reports a specific time domain window size for PUSCH transmissions with the same TB, including PUSCH repetitions and TB processing over multiple slots, and one time domain window size for PUSCH with different TBs. Alternatively, UE reports one time domain window size for PUSCH repetitions, TB processing over multiple slots and PUSCH with different TBs respectively.

In some embodiments, the UE capability reporting discussed above may also apply to Msg3 repetitions. In some embodiments, the time domain window size for Msg3 repetition is determined based on some predefined rules or implicitly determined by the transmission characteristics. In some embodiments, the transmission characteristics include at least one of the number of repetitions, the number of symbols per repetition and TDD configuration.

In some embodiments, UE may enable the hopping based on the actual time domain window size and the bundle size.

In one example, a nominal time domain window size is 2 slots and bundle size is 2 slots, frame structure is DDDSUDDSUU, the number of repetition is 8, inter-slot hopping is enabled. The bundle size is equal to or smaller than the nominal time domain window size and UE hopping based on bundle size. As show in FIG. 11, hop 1 includes 2 slots and hop 2 includes 2 slots and hop 3 includes 1 slot, since there is no more continuous available UL slot.

In some embodiments, if the S slot is not an available UL slot, the actual time domain window cannot include it.

In some embodiments, the scheme can be used for all use cases of PUSCH repetitions: Use case 1 (back-to-back PUSCH transmissions within one slot); Use case 2 (non-back-to-back PUSCH transmissions within one slot); Use case 3 (back-to-back PUSCH transmissions across consecutive slots); Use case 4 (non-back-to-back PUSCH transmissions across consecutive slots); Use case 5 (PUSCH transmissions across non-consecutive slots).

In some embodiments, the actual time domain window during which UE can maintain the phase continuity may be different for different use cases.

In some embodiments, the scheme can be used for PUSCH transmissions for one TB processed over consecutive slots.

In some embodiments, the scheme above can be used for PUCCH. The configured nominal time domain window size and bundle size can also be used for PUCCH. In some embodiments, gNB configures a nominal time domain window size, one or more bundle size for PUCCH for UE separately. In this case, the nominal time domain window size and bundle size are different between PUCCH and PUSCH.

Embodiment 3

For joint channel estimation, inter-slot bundling, and inter-slot hopping, UE reports a maximum time domain window size used for maintaining the power consistency and phase continuity among PUSCH/PUCCH transmissions subject to power consistency and phase continuity requirements to gNB, and gNB configures a nominal time domain window size for UE.

In some implementations, the time domain window includes at least one of time domain window size, the starting point of the time domain window.

In some implementations, the nominal time domain window size may be determined based on based on a number of repetitions, a number of slots and/or a number of symbols. In addition, the nominal time domain window size is not be larger than the maximum size of time domain window supported by UE. In some embodiments, the nominal time domain window can be indicated by RRC signaling, MAC-CE or DCI. Furthermore, the time domain window size can be determined by a joint coding with TDRA if indicated by DCI. In some embodiments, the time domain windows size is included as one column in the TDRA.

In some embodiments, when only a nominal time domain window size is configured and gNB does not enable the hopping.

Figure 10:
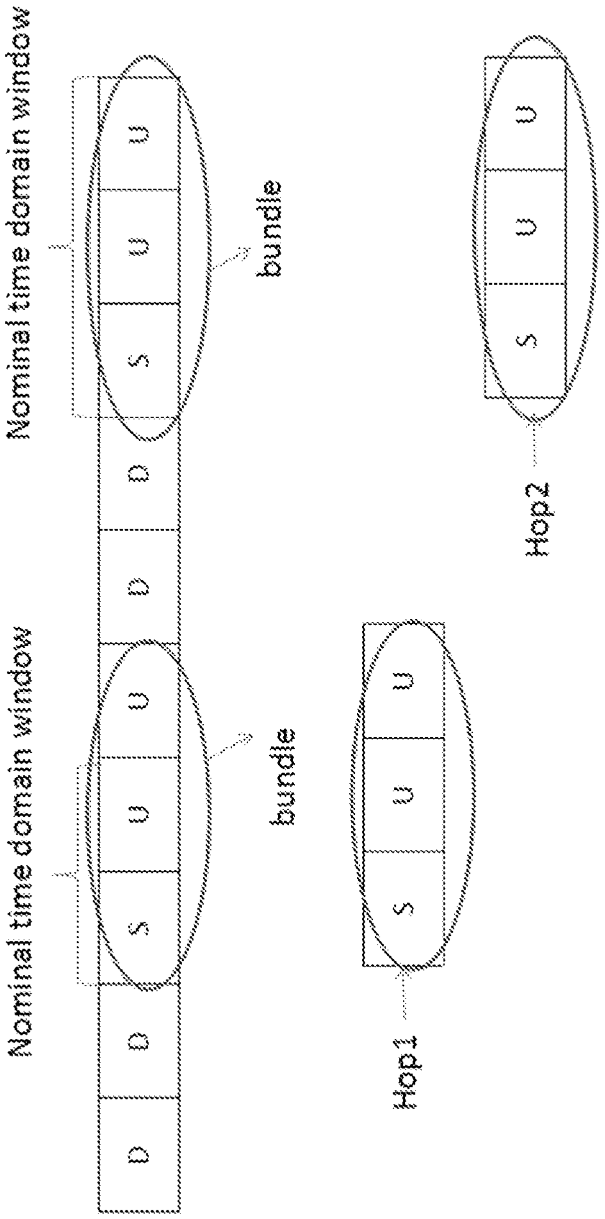
FIG. 10 shows the relationship between a bundle and a nominal time domain window.

FIG. 10 shows the relationship between a bundle and a nominal time domain window.

In some embodiments, when only a nominal time domain window is configured, and the inter-slot hopping is enabled, the bundle is equal to the nominal time domain window and a hopping between inter nominal windows. In one example, a nominal time domain window size is 3 slots, the frame structure is DDSUUDDSUU, the number of repetitions is 8, and the inter-slot hopping is enabled. The bundle size is equal to 3 and UE hopping based on the bundle size. As show in FIG. 10, hop 1 includes 3 slots and hop 2 includes 3 slots.

Figure 11:
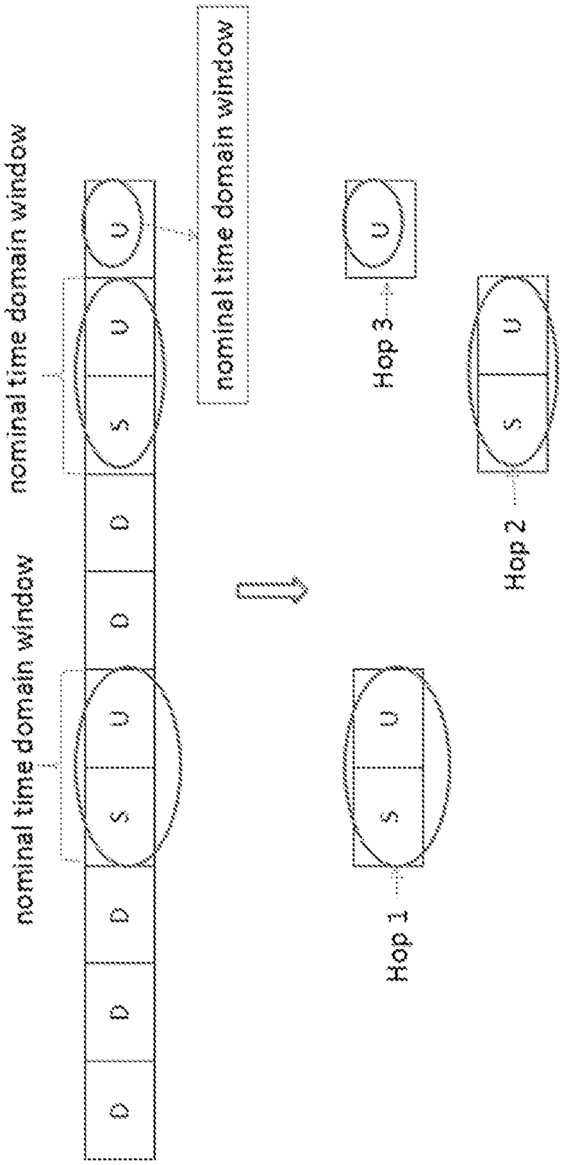
FIG. 11 shows the relationship between a hopping and a nominal time domain window.

FIG. 11 shows the relationship between a hopping and a nominal time domain window.

In one example, a nominal time domain window size is 2 slots, frame structure is DDDSUDDSUU, the number of repetitions is 8, inter-slot hopping is enabled. The bundle size is equal to the nominal time domain window size and UE hopping based on nominal time domain window size. As shown in FIG. 11. hop 1 include 2 slots and hop 2 include 2 slots and hop 3 include 1 slot, since there is no more continuous available UL slot.

Figure 12:
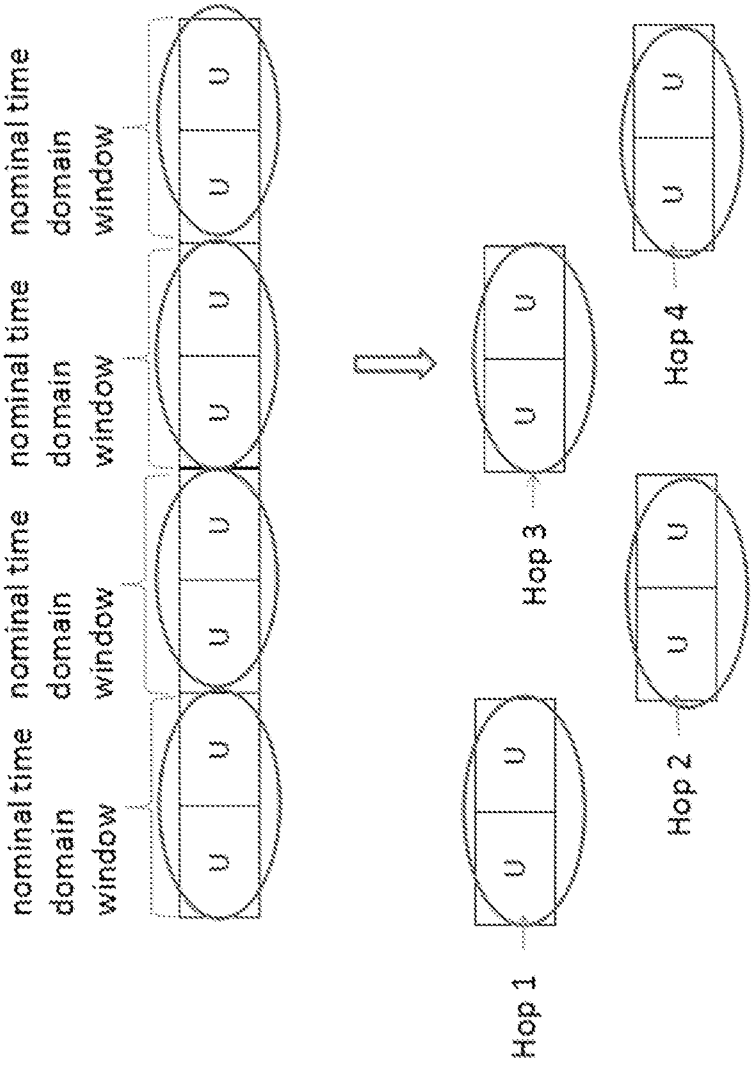
FIG. 12 shows the relationship between a hopping and a nominal time domain window.

FIG. 12 shows the relationship between a hopping and a nominal time domain window.

In one example, a nominal time domain window size is 2 slots, frame structure is FDD, the number of repetitions is 8, inter-slot hopping is enabled. The bundle size is equal to the nominal time domain window size and UE hopping based on the nominal time domain window, as shown in FIG. 12.

In some embodiments, if the S slot is not an available UL slot, the nominal time domain window cannot include it.

In some embodiments, the scheme can be used for all use cases of PUSCH repetitions: Use case 1 (back-to-back PUSCH transmissions within one slot); Use case 2 (non-back-to-back PUSCH transmissions within one slot); Use case 3 (back-to-back PUSCH transmissions across consecutive slots); Use case 4 (non-back-to-back PUSCH transmissions across consecutive slots); Use case 5 (PUSCH transmissions across non-consecutive slots).

In some embodiments, the actual time domain window during which UE can maintain the phase continuity may be different for different use cases.

In some embodiments, the scheme can be used for PUSCH transmissions for one TB processed over consecutive slots.

In some embodiments, the scheme can be used for PUCCH. The configured nominal time domain window size can also be used for PUCCH. In some embodiments, gNB configures a nominal time domain window size for UE separately. In this case, the nominal time domain window size is different between PUCCH and PUSCH.

Embodiment 4

When a time domain window is introduced for joint channel estimation, the disclosed technology can be implemented in some embodiments to determine a starting point of a time domain window when gNB configures a time domain window for UE. In some embodiments, the resources of a time domain window include consecutive physical resources. In some embodiments, the resources of a time domain window include non-consecutive physical resources. In some embodiments, the starting point of time domain window is the last symbol of the UL grant for PUSCH. In some embodiments, the starting point of time domain window is the first symbol of the UL grant for PUSCH. In some embodiments, the starting point of time domain window is any one of the symbols of the grant for PUSCH. In some embodiments, the starting point of time domain window is the starting symbol of PUSCH transmission which is indicated by UL grant. In some embodiments, the starting point of a time domain window is the starting symbol of actual PUSCH transmission. In one example, the starting point of a time domain window is the first available symbol of PUSCH. In some embodiments, the time domain window is the actual time domain window. In some embodiments, the time domain window is a nominal time domain window.

In some embodiments, the starting point of a nominal/actual time domain window is the first symbol of a set of PUSCH transmissions.

In some embodiments, a set of PUSCH transmission could be consecutive or non-consecutive physical slots or symbols. In some embodiments, a set of PUSCH transmission is transmitted the same TB(s).

Figure 13:
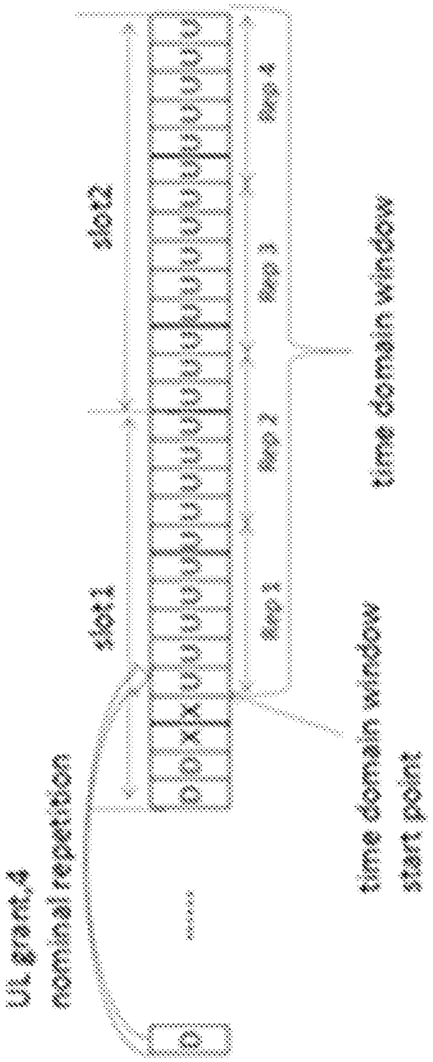
FIG. 13 shows an example of a starting point of a time domain window.

FIG. 13 shows an example of a starting point of a time domain window.

In some embodiments, the starting point of a nominal/actual time domain window using one bit field in the DCI scheduling the PUSCH/PUCCH transmissions to indicate whether the starting symbol (or the first symbol) of the scheduled PUSCH/PUCCH transmissions is the starting symbol (or the first symbol) of the time domain window. Taking PUSCH repetition type A as an example, as show in FIG. 13 where Rep is equal to a PUSCH repetition, a UL grant (e.g. scramble by C-RNTI or CS-RNTI) schedules a PUSCH transmission with 4 repetitions and indicates the starting or first symbol of the scheduled PUSCH transmission is the starting or first symbol of the time domain window, and the starting point of the time domain window is the first 'U' symbol in slot 1.

Figure 14:
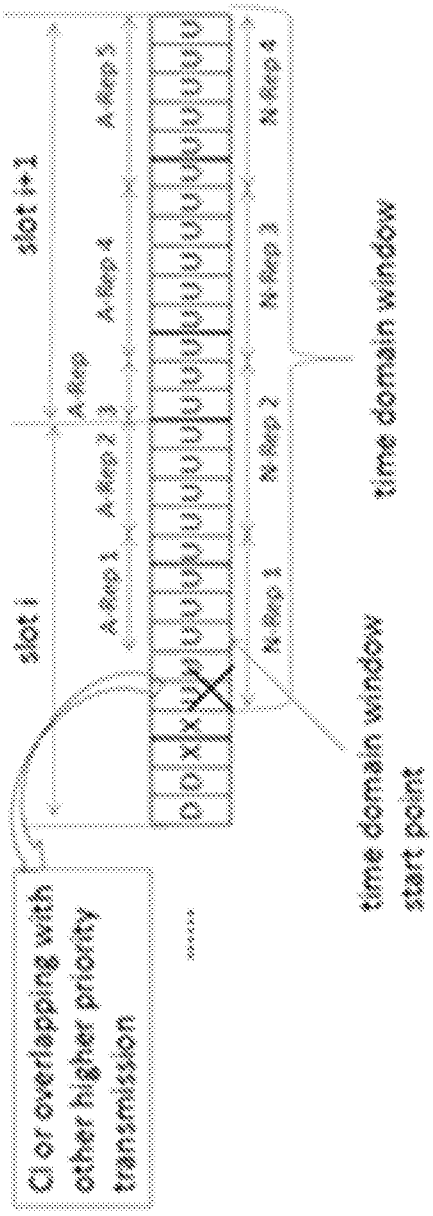
FIG. 14 shows another example of a starting point of a time domain window.

FIG. 14 shows another example of a starting point of a time domain window.

In some embodiments, the PUSCH/PUCCH transmission is the transmission occasion which is indicated by the DCI or RRC signaling. In some embodiments, the PUSCH/PUCCH transmission is the actual PUSCH/PUCCH transmission occasion. Taking PUSCH type B as an example, as show in FIG. 14 where N-Rep is equal to a nominal PUSCH repetition and A-Rep is equal to a actual PUSCH repetition, a PUSCH with 4 nominal repetitions and a duration of each nominal repetition is 6 symbols. The first 2 'U' symbols of the N-Rep 1 should be canceled due to a received CI or a collision with another higher priority transmission. N-Rep 1 is split into an A-Rep 1 and the starting symbols of A-rep 1 is the 3rd 'U' symbol in slot i. The starting symbol of the time domain window is the 3rd 'U' in slot i.

In some embodiments, the starting symbol of a nominal/actual time domain window is the first symbol within a period for each PUSCH/PUCCH, whether the PUSCH is a configured grant PUSCH and the PUCCH is a periodic PUCCH configured by RRC.

In some embodiments, a first symbol of the time domain window is the first symbol of a radio frame. In some embodiments, a first symbol of the time domain window is at a fixed location of a radio frame. In some embodiment, the time domain window should be re-started when the transmission is switched to the next radio frame.

In some embodiments, the starting symbol of a nominal/actual time domain window is the starting symbol of each wireless frame.

Figure 15:
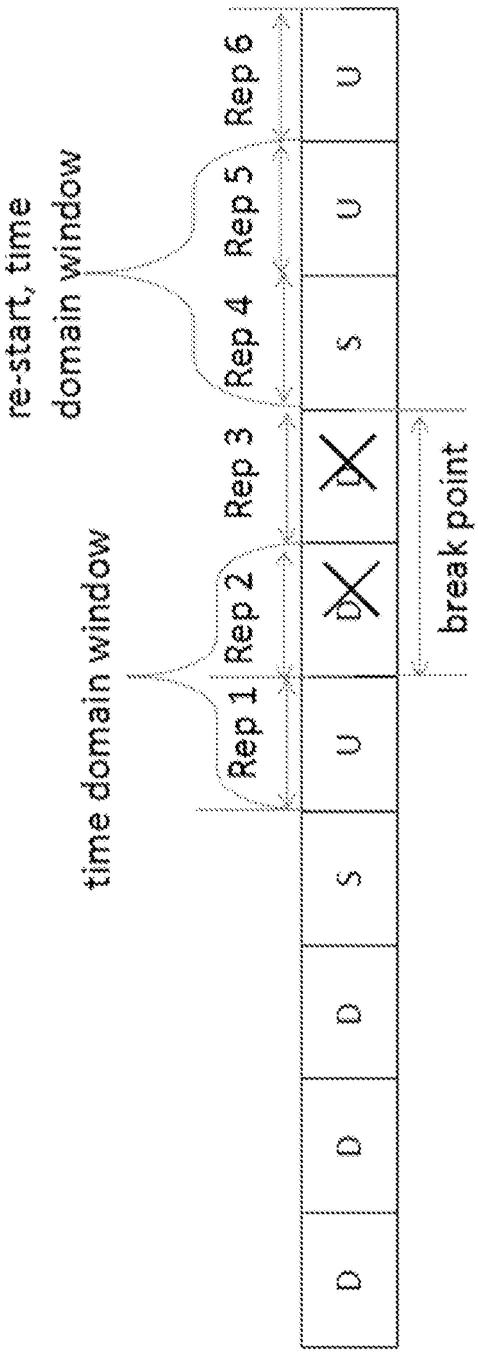
FIG. 15 shows that a time domain window restarts when there is a break point.

FIG. 15 shows that a time domain window restarts when there is a break point.

In some embodiments, a time domain window restarts when a break point occurs within the time domain window. For instance, as show in FIG. 15, the time domain window is configured and the size of the time domain window is 2 slots, the frame structure is DDDSUDSUUU, where D is defined as a DL slot, S is defined as a specific slot which include DL, X, UL symbols, and U is defined as a UL slot. A type A PUSCH transmission with 6 repetitions and the first repetition (Rep 1) can be carried by the $5^{th}$ slot, and second and third repetition transmissions (Rep 2 and Rep 3) are interrupted due to two break points. In this case, the time domain window should be restarted.

In some embodiments, the time domain window should be restarted if at least one of the following conditions is met: PUSCH transmission on consecutive resources; PUSCH transmission on non-consecutive resources; the RBs occupying PUSCH transmission are changed; the phase continuity for PUSCH transmission is changed; the power control parameters for PUSCH transmission is changed; the timing advance parameters for PUSCH transmission are changed; the TPMI for PUSCH transmission is changed; dynamic uplink switching in CA scenario; dynamic BWP switching; dynamic switching between NUL and SUL; physical non-consecutive time resource should be larger than a threshold value of K, where the value of K is configurable or pre-defined, and the value of K includes a number of symbols or slots or repetitions or ms.

Figure 16:
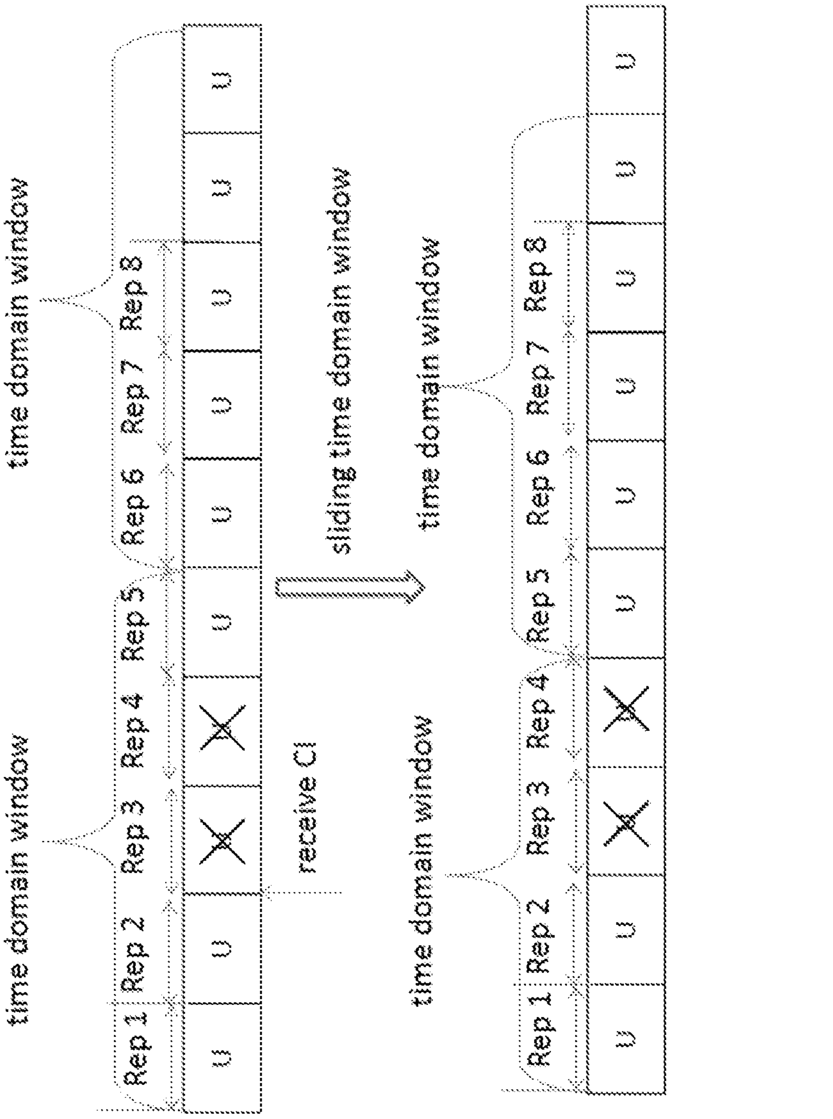
FIG. 16 shows an example of a time domain window sliding.

FIG. 16 shows an example of a time domain window sliding.

In some embodiments, an offset value is configured for UE and the time domain window sliding is allowed. The granularity of offset may be several slots, symbols or repetitions. For instance, as show in FIG. 16, the time domain window is configured and the size of the time domain window is 5 slots or 5 repetitions, and the frame structure is UUUUUUUUUU, where U is defined as a UL slot or a UL Rep (Rep is defined as a repetition). A PUSCH transmission with 8 repetitions and the first repetition (Rep 1) is carried by the $1^{st}$ U, if the inter-slot hopping is enabled, based on Embodiment 3 discussed above, two bundle sizes may be obtained, and bundle size 1 is 5 repetitions (Rep 1-Rep 5) and bundle size 2 is 3 repetitions (Rep 6-Rep 8). When UE receives a CI signaling to cancel Rep 3 and Rep 4 transmissions, and the phase continuity is changed between {Rep 1, Rep 2} and {Rep 5}. In this case, the $2^{nd}$ time domain window sliding one repetition to the left, then the bundle size 1 is 2 repetitions and includes {Rep 1, Rep 2}, the bundle size 2 is 4 repetitions, {Rep 5, Rep 6, Rep 7, Rep 8}.

In some embodiments, it can be fixed in the time domain once configured. For instance, it can be aligned with the start of frame boundary or aligned with the start of one period for CG PUSCH.

In some embodiments, it can also be determined dynamically by DCI.

In some embodiments, the start of actual time domain window, it can be determined by a group of consecutive slots/symbols/repetitions based on the available transmission occasions.

In some embodiments, the scheme can be used for PUCCH.

In some embodiments, the start of time domain window may or may not be same for PUCCH and PUSCH.

In some embodiments, if the time domain window is fixed in certain time domain occasions based on the frame boundary, the start of time domain window can be same for both PUSCH and PUCCH.

In some embodiments, the starting point of time domain window is determined by both PUSCH and PUCCH. In some embodiments, it may be different if the starting point of the time domain window is related to the scheduling DCI.

Embodiment 5

In Rel 15/16, if PUSCH repetition Type B as described in clause 6.1 of [6, TS38.214] is applied to a physical channel, the UE transmission shall be such that the channel over which a symbol on the antenna port used for uplink transmission is conveyed can be inferred from the channel over which another symbol on the same antenna port is conveyed if the two symbols correspond to the same actual repetition of a PUSCH transmission with repetition Type B. When the concept of time domain window is introduced for joint channel estimation. Similarly, the channel states within same time domain window may also be reused, so the current spec in Rel-15/16 should be modified as below.

If PUSCH repetition Type A/Type B is applied to a physical channel, the UE transmission shall be such that the channel over which a symbol on the antenna port used for uplink transmission is conveyed can be inferred from the channel over which another symbol on the same antenna port is conveyed if the two symbols correspond to the same time domain window (TDW) of PUSCH transmissions with repetition type, Type A/Type B.

Embodiment 6

In Rel-16 2-step RACH, both separate PRACH occasions (RO) and separate preamble with shared RO are supported for the differentiation between 2-step RACH and 4 step RACH. Similarly, some mechanisms are needed to differentiate between RACH procedure without Msg3 PUSCH repetition and RACH procedure with Msg3 PUSCH repetition if Msg3 PUSCH repetition is supported.

Option 1: Separate RO

For separate RO configurations, gNB may differentiate whether UE requests Msg3 repetition or not by separate RO time/frequency resources. There is no need to introduce new rules to determine the RO time/frequency resources, and thus the time-domain random access configurations and the frequency resources determination defined in Clause 6.3.3.2 in TS 38.211 are reused. However, new separate RRC parameters for PRACH configuration are needed. In 2-step RACH, two IEs (RACH-ConfigCommonTwoStepRA and RACH-ConfigGenericTwoStepRA) are introduced, and part of the new RRC parameters in the two IEs are listed below. If Option 1 is adopted, similar new RRC parameters are needed. In addition, it may also have large specification impacts on the RACH procedures specified in TS 38.321.

TABLE 1

| |
|---|
| msgA-PRACH-ConfigurationIndex |
| msgA-RO-FDM |
| msgA-RO-FrequencyStart |
| msgA-ZeroCorrelationZoneConfig-r16 |
| msgA-PRACH-RootSequenceIndex |
| msgA-RestrictedSetConfig |
| msgA-TotalNumberOfRA-Preambles |
| msgA-SSB-PerRACH-OccasionAndCB-PreamblesPerSSB |

Option 2: Separate PRACH Preamble with Shared RO

Figure 17:
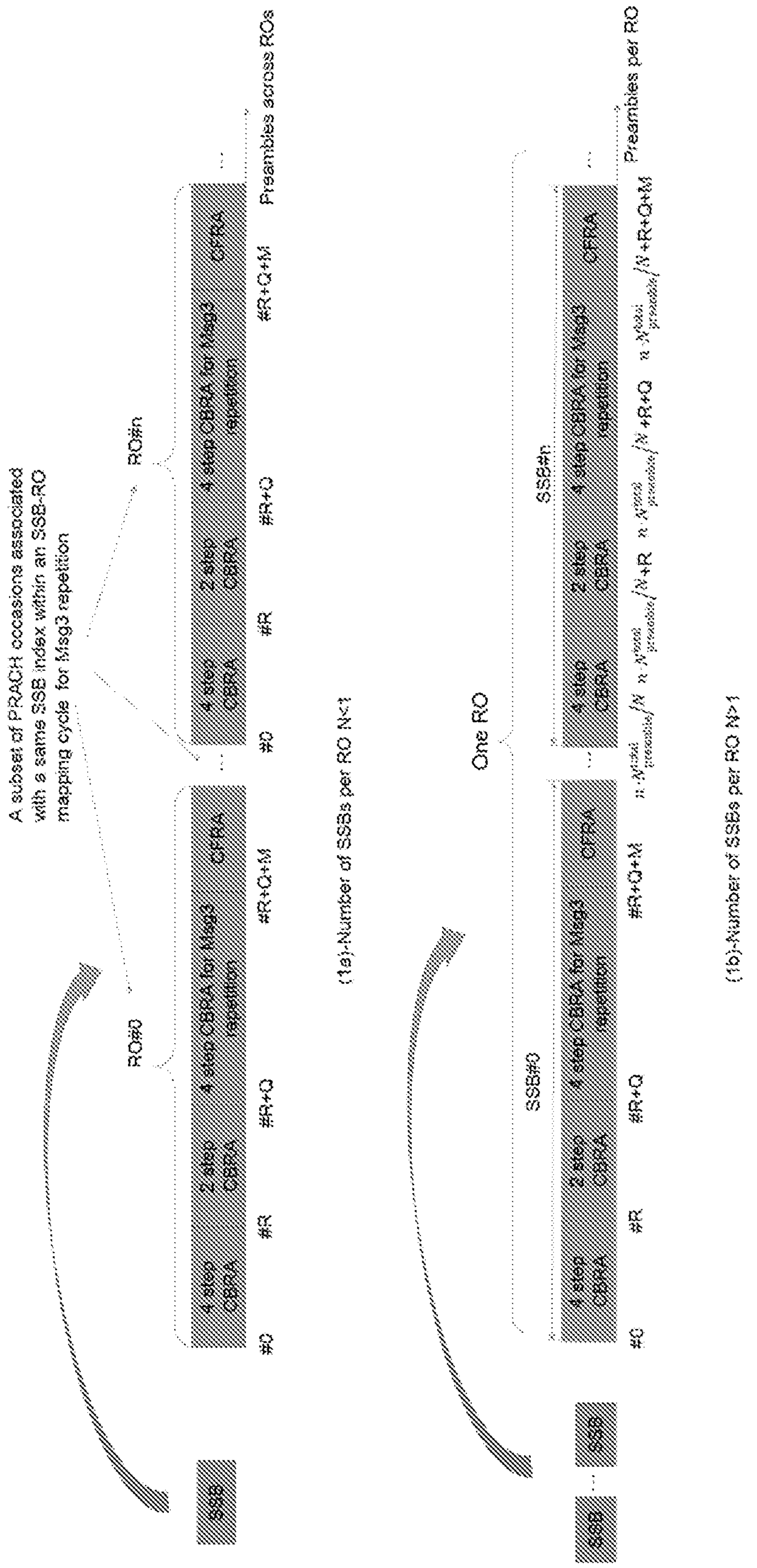
FIG. 17 shows synchronization signal block-random access channel (RACH) occasion (SSB-RO) mapping for separate physical random access channel (PRACH) preambles with shared PRACH occasions.

FIG. 17 shows synchronization signal block-random access channel (RACH) occasion (SSB-RO) mapping for separate physical random access channel (PRACH) preambles with shared PRACH occasions.

To limit the specification impacts, one alternative way is to use separate PRACH preambles with shared RO. In such a case, no separate PRACH configuration is needed, and it only requires indicating the number of preambles used for Msg3 repetition per SSB, or a subset of ROs if partial RO sharing is supported in the case of one SSB corresponding to multiple ROs. That is, similar RRC parameters like msgA-CB-PreamblesPerSSB-PerSharedRO and msgA-SSB-SharedRO-MaskIndex that is introduced for 2-step RACH can be introduced for Msg3 repetition. In FIG. 17, an example for preamble partition with shared RO is provided, whether N is the number of SSB indices associated with one PRACH occasion, and R, Q and M is the number of preambles allocated for 4 step CBRA without requesting Msg3 repetition, 2-step CBRA and 4-step CBRA requesting Msg3 repetition respectively.

$$N_{preamble}^{total}$$

is provided by totalNumberOfRA-Preambles for 4-step RACH procedure.

For legacy 4-step RACH procedure, UE is provided with a number N of SS/PBCH block indices associated with one PRACH occasion and a number R of contention based preambles per SS/PBCH block index per valid PRACH occasion by ssb-perRACH-OccasionAndCB-Preambles-PerSSB. The legacy 4-step RACH procedure is Type-1 random access procedure.

For 2-step RACH procedure, with common configuration of PRACH occasions with legacy 4-step RACH procedure, UE is provided with a number N of SS/PBCH block indices associated with one PRACH occasion by ssb-perRACH-OccasionAndCB-PreamblesPerSSB and a number Q of contention based preambles per SS/PBCH block index per valid PRACH occasion by msgA-CB-PreamblesPerSSB-Per-SharedRO.

For 4-step RACH procedure requesting Msg3 PUSCH repetition, with common configuration of PRACH occasions with legacy 4-step RACH procedure, or with common configuration of PRACH occasions with 2-step RACH procedure, UE is provided with a number N of SS/PBCH block indices associated with one PRACH occasion by ssb-per-RACH-OccasionAndCB-PreamblesPerSSB and a number M of contention based preambles per SS/PBCH block index per valid PRACH occasion by RRC parameter. In some embodiments, UE is provided with M preambles for PRACH transmission requesting Msg3 PUSCH repetition. In some embodiments, the M preambles are contention based preambles with consecutive indices. In some embodiments, the PRACH transmission can be on a subset of PRACH occasions associated with a same SS/PBCH block index within an SSB-RO mapping cycle for UE provided with a PRACH mask.

In some embodiments, UE share the same sub-set of ROs associated with a same SS/PBCH block index within an SSB-RO mapping cycle for PRACH transmission between 2-step RACH and 4 step RACH for Msg3 repetition.

In some embodiments, if N<1, one SS/PBCH block index is mapped to 1/N consecutive valid PRACH occasions and M contention based preambles with consecutive indices associated with the SS/PBCH block index per valid PRACH occasion start from preamble index R. If N≥1, M contention based preambles with consecutive indices associated with SS/PBCH block index n, 0≤n≤N−1, per valid PRACH occasion start from preamble index $$n \cdot N_{preamble}^{total} / N + R \text{ or } n \cdot N_{preamble}^{total} / N + Q,$$

where $$N_{preamble}^{total}$$

is provided by totalNumberOfRA-Preambles for 4-step RACH procedure or msgA-TotalNumberOfRA-Preambles for 2-step RACH procedure. In some embodiments, this applies to the case that the BWP selected for a random access procedure is configured with only 4-step RA type Random Access Resources or only 2-step RA type Random Access Resources.

In some embodiments, if N<1, one SS/PBCH block index is mapped to 1/N consecutive valid PRACH occasions and M contention-based preambles with consecutive indices associated with the SS/PBCH block index per valid PRACH occasion start from preamble index R+Q. If N≥1, M contention based preambles with consecutive indices associated with SS/PBCH block index n, 0≤n≤N−1, per valid PRACH occasion start from preamble index $$n \cdot N_{preamble}^{total}/N + R + Q.$$

In some embodiments, $$N_{preamble}^{total}$$

is the total number of preambles provided by totalNumberOfRA-Preambles for 4-step RACH procedure and msgA-TotalNumberOfRA-Preambles for 2-step RACH procedure. In some embodiments, this applies to the case that the BWP selected for Random Access procedure is configured with both 4-step RA type Random Access Resources and 2-step RA type Random Access Resources.

In some embodiments, if N<1, one SS/PBCH block index is mapped to 1/N consecutive valid PRACH occasions and M contention based preambles with consecutive indices associated with the SS/PBCH block index per valid PRACH occasion start from preamble index R+Q in a subset of PRACH occasions. In some embodiments, if N<1, one SS/PBCH block index is mapped to 1/N consecutive valid PRACH occasions and M contention based preambles with consecutive indices associated with the SS/PBCH block index per valid PRACH occasion start from preamble index R in another subset of PRACH occasions.

Embodiment 7

In 2-step RACH, an RSRP threshold is introduced for selecting between 2-step RACH and 4-step RACH. 2-step RACH is selected only when the RSRP of the downlink pathloss reference is above the RSRP threshold.

TABLE 2

| |
|---|
| > else if the BWP selected for Random Access procedure is configured with both 2-step and 4-step RA type Random Access Resources and the RSRP of the downlink pathloss reference is above msgA-RSRP-Threshold; or |
| 1> if the BWP selected for Random Access procedure is only configured with 2-step RA type Random Access resources (i.e. no 4-step RACH RA type resources configured); or |
| 1> if the Random Access procedure was initiated for reconfiguration with sync and if the contention-free Random Access Resources for 2-step RA type have been explicitly provided in rach-ConfigDedicated for the BWP selected for Random Access procedure: |
| 2> set the RA TYPE to 2-stepRA. |

Figure 18:
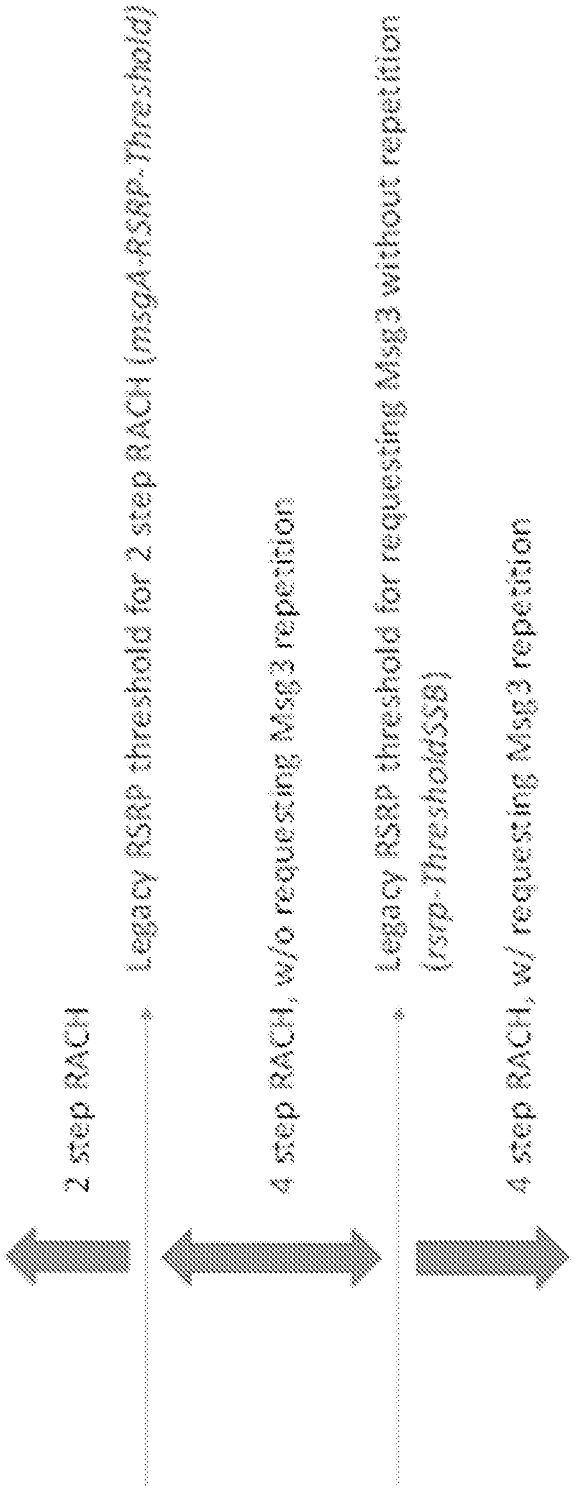
FIG. 18 shows a selection among different RACH procedures.

FIG. 18 shows a selection among different RACH procedures.

If Msg3 repetition is introduced, how should the UE choose a RACH procedure with or without Msg3 repetition needs to be determined. whether and how to introduce an RSRP threshold for choosing different RACH procedures should also be determined.

One way is to use the two legacy RSRP thresholds to select the separate PRACH resources for 4-step RACH procedure requesting Msg3 repetition. As shown in FIG. 18, a separate PRACH resource for Msg3 repetition is used only if the RSRP of the downlink pathloss reference is lower than rsrp-ThresholdSSB.

If the RSRP of the downlink pathloss reference is equal to or above rsrp-ThresholdSSB while equal or lower than msgA-RSRP-Threshold, 4-step RACH procedure without requesting Msg3 repetition is triggered, or the UE uses PRACH resources without requesting Msg3 repetition for 4-step RACH procedure. If the selected RA TYPE is set to 4-stepRA and if at least one of the SSBs with RSRP above rsrp-ThresholdSSB is available, the UE selects an SSB with RSRP above rsrp-ThresholdSSB, and the UE should trigger PRACH procedure without Msg3 repetition. If no SSB with RSRP is above rsrp-ThresholdSSB, the UE selects any SSB, and the UE should trigger PRACH procedure with Msg3 repetition. The RSRP is CSI-RSRP or SS-RSRP.

Figure 19:
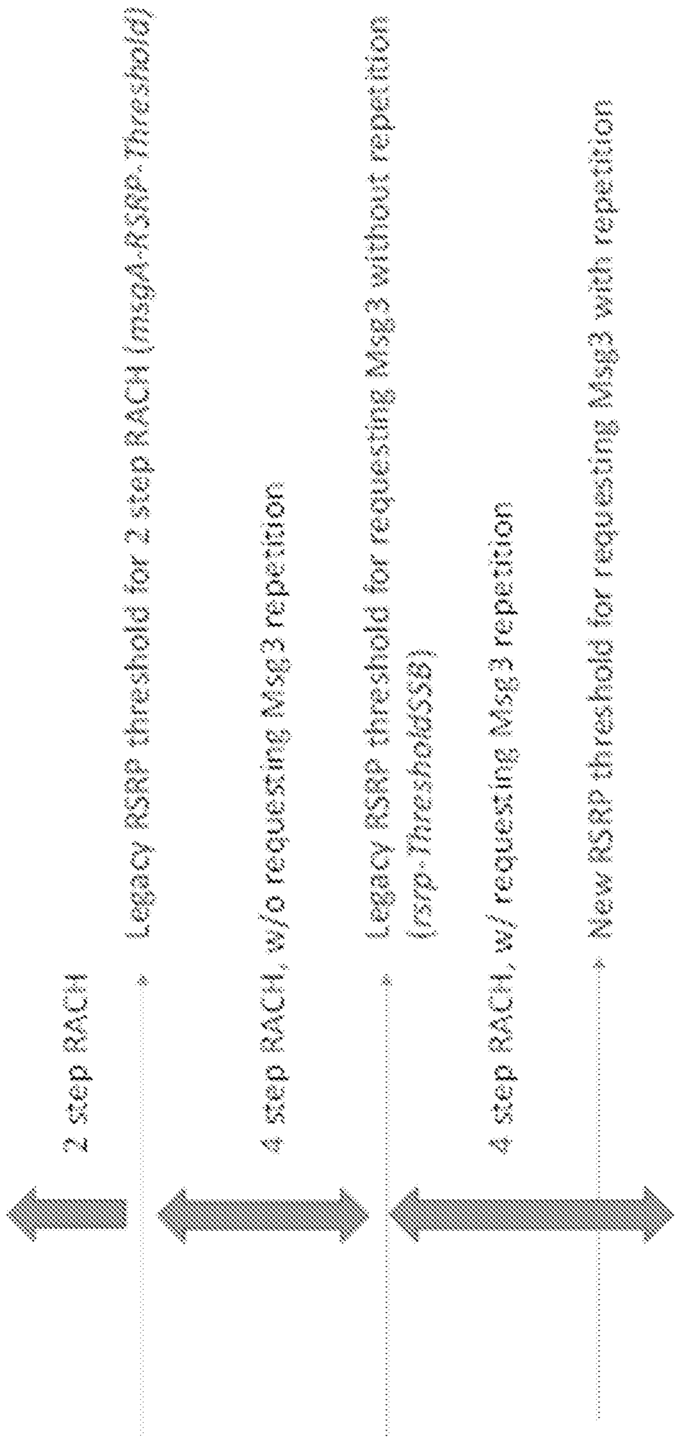
FIG. 19 shows an example of a reference signal received power (RSRP) threshold for 4-step RACH procedure requesting Msg3 repetition for selection among different RACH procedures.
Figure 20:
FIG. 20 shows another example of a RSRP threshold for 4-step RACH procedure requesting Msg3 repetition for selection among different RACH procedures.

FIG. 19 shows an example of a reference signal received power (RSRP) threshold for 4-step RACH procedure requesting Msg3 repetition for selection among different RACH procedures. FIG. 20 shows another example of a RSRP threshold for 4-step RACH procedure requesting Msg3 repetition for selection among different RACH procedures.

Alternatively, a new RSRP threshold is introduced for 4-step RACH procedure requesting Msg3 repetition. The threshold is smaller than the RSRP threshold for 4-step RACH procedure without requesting Msg3 repetition, i.e., rsrp-ThresholdSSB. As shown in FIG. 19, a separate PRACH resource for Msg3 repetition is used only if the RSRP of the downlink pathloss reference is lower than rsrp-ThresholdSSB. In some embodiments, the RSRP of the downlink pathloss reference is higher than the new RSRP threshold for 4-step RACH procedure requesting Msg3 repetition.

In some embodiments, PRACH resource for Msg3 without repetition is used only if the RSRP of the downlink pathloss reference is lower than msgA-RSRP-Threshold and above rsrp-ThresholdSSB. Legacy RACH procedure requesting Msg3 repetition is triggered only if the RSRP of the downlink pathloss reference is lower than msgA-RSRP-Threshold and above rsrp-ThresholdSSB.

If the selected RA_TYPE is set to 4-stepRA and if at least one of the SSBs with SS-RSRP above rsrp-ThresholdSSB is available, the UE selects an SSB with SS-RSRP above rsrp-ThresholdSSB, and the UE should trigger PRACH procedure without Msg3 repetition. If no SSB with SS-RSRP is above rsrp-ThresholdSSB, the UE selects any SSB, and the UE should trigger PRACH procedure with Msg3 repetition or the UE should trigger PRACH procedure without Msg3 repetition.

If the RSRP of the downlink pathloss reference is above the new RSRP threshold for 4-step RACH procedure requesting Msg3 repetition, the UE selects an SSB with SS-RSRP above the threshold, Otherwise, the UE selects any SSB, and the UE should trigger PRACH procedure with Msg3 repetition.

If the RSRP of the downlink pathloss reference is lower than msgA-RSRP-Threshold, the selected RA TYPE is set to 4-stepRA. Then, if at least one of the SSBs with SS-RSRP above rsrp-ThresholdSSB is available, the UE selects an SSB with SS-RSRP above rsrp-ThresholdSSB, and the UE should trigger PRACH procedure without Msg3 repetition. If no SSB with SS-RSRP is above rsrp-ThresholdSSB and if at least one of the SSBs with SS-RSRP above the new RSRP threshold is available, the UE selects an SSB with SS-RSRP above the new RSRP threshold and the UE should trigger PRACH procedure with Msg3 repetition. Otherwise, the UE selects any SSB, and the UE should trigger PRACH procedure with Msg3 repetition.

In some embodiments, a new RSRP threshold is introduced for 4-step RACH procedure requesting Msg3 repetition. The threshold is smaller than the RSRP threshold for 4-step RACH procedure without requesting Msg3 repetition, i.e., rsrp-ThresholdSSB. As shown in FIG. 19, separate PRACH resource for Msg3 repetition is used only if the RSRP of the downlink pathloss reference is lower than the new RSRP threshold.

If the selected RA_TYPE is set to 4-stepRA and if at least one of the SSBs with SS-RSRP above rsrp-ThresholdSSB is available, the UE selects an SSB with SS-RSRP above rsrp-ThresholdSSB, and the UE should trigger PRACH procedure without Msg3 repetition. If no SSB with SS-RSRP is above rsrp-ThresholdSSB, the UE selects any SSB.

If at least one of the SSBs with SS-RSRP above the new RSRP is available, the UE should trigger PRACH procedure with Msg3 repetition. If no SSB with SS-RSRP is above the new RSRP, the UE should trigger PRACH procedure without Msg3 repetition.

Embodiment 8

In Rel-15/16, the following conditions are considered to determine whether a PUSCH repetition should be omitted for regular PUSCH repetition type A.

TABLE 3

| |
|---|
| For PUSCH repetition Type A, a PUSCH transmission in a slot of a multi-slot PUSCH transmission is omitted according to the conditions in Clause 9, Clause 11.1 and Clause 11.2A of [6, TS38.213]. |

The three Clauses (Clause 9, Clause 11.1 and Clause 11.2A), which have impacts on PUSCH transmission, are related to PUCCH overlapping, slot configuration/SFI and UL cancellation respectively. However, collision handling mechanisms discussed above cannot be directly applied to Msg3 repetition, since gNB cannot identify which UE is transmitting Msg3 PUSCH in a contention-based RACH access (CBRA) case.

Figure 21:
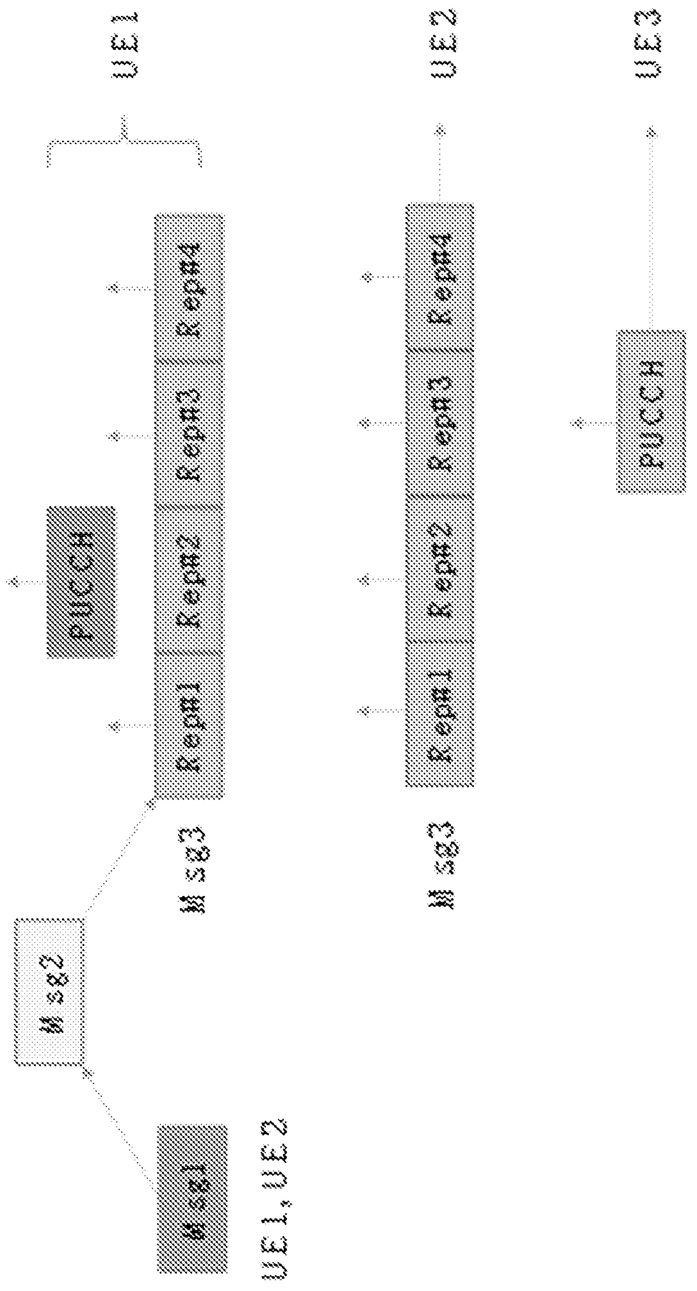
FIG. 21 shows an overlapping between physical uplink control channel (PUCCH) and Msg3 physical uplink shared channel (PUSCH) repetitions.

FIG. 21 shows an overlapping between physical uplink control channel (PUCCH) and Msg3 physical uplink shared channel (PUSCH) repetitions.

Example 1

If Msg3 repetition is supported, it becomes very difficult to avoid the overlapping between PUCCH and Msg3 repetition. On the other hand, gNB doesn't know which UE is transmitting Msg3 PUSCH since the UL RAR grant is scrambled by TC-RNTI for multiple UEs. Therefore, gNB cannot be aware of whether the UCI would be multiplexed on Msg3 PUSCH. As shown in FIG. 21, where UE #1 and UE #2 use the same PRACH preamble for CBRA procedure, and they both receiving corresponding Msg2 which schedules Msg3 repetition. Thus, both UEs would transmit Msg3 repetitions. If UE #1 has PUCCH transmission overlapping with Rep #2, and UE #3 transmits PUCCH which overlaps with Rep #3, gNB doesn't know whether the UCI would be multiplexed on Rep #2 and/or Rep #3. To avoid blind decoding of Msg3 PUSCH with or without UCI, it should clarify that UCI is not multiplexed in the Msg3 PUSCH.

Msg3 PUSCH repetitions can be overlapped with a PUCCH carrying HARQ-ACK/CSI, and UCI is not multiplexed in the overlapped Msg3 PUSCH repetitions.

A following-up question is whether the UE should transmit the overlapped Msg3 PUSCH repetition or transmit PUCCH. If the overlapped Msg3 PUSCH repetition is transmitted (i.e., PUCCH is dropped), such a case is not allowed since it imposes scheduling restrictions to NW. If PUCCH is transmitted (i.e., the overlapped Msg3 PUSCH repetition is dropped), gNB would always decode the PUCCH, and how gNB would decode Msg3 PUSCH may depend on gNB implementation.

In one example, gNB always assume all Msg3 repetitions are transmitted. In the example shown FIG. 21, gNB may successfully decode Msg3 from UE #2.

In another example, gNB can first blind detect PUCCH transmission, and gNB will not consider a Msg3 repetition as long as it overlaps with a PUCCH from all UEs in the same cell. That is, gNB only tries to decode Msg3 repetition #1 and #4 in the example shown FIG. 21. gNB can choose this implementation if gNB knows only few PUCCHs are scheduled in the cell in the concerned slots.

For a given UE, if one or more Msg3 repetitions overlap with a PUCCH carrying HARQ-ACK/CSI, the UE transmits PUCCH and drops the overlapped one or more Msg3 repetitions.

Given the overlapping conditions may be different for different UEs, PUCCH overlapping is not considered to determine whether or not a slot is available slot for Msg3 repetition. Otherwise, different UEs would postpone different number of Msg3 repetitions and gNB cannot be aware of this. As a result, whether or not a slot is counted as one available slot for Msg3 repetition does not depend on PUCCH overlapping. In other words, if a Msg3 repetition is dropped due to the overlapping with PUCCH, it will be counted as one repetition in the total number of repetitions.

In some embodiments, the first repetition of Msg3 PUSCH repetitions cannot overlap with a PUCCH. A PUCCH can overlap with a repetition of Msg3 PUSCH repetition other than the first repetition.

If a PUCCH overlaps with one or more Msg3 PUSCH repetitions other than the first repetition, UCI is multiplexed in Msg3 PUSCH, or PUCCH is dropped, or the overlapped repetition is dropped.

In some embodiments, the first repetition of Msg3 PUSCH repetition cannot overlap with a PUCCH with repetition. In some embodiments, Msg3 PUSCH repetition cannot overlap with a PUCCH with repetition.

Example 2

Table 4 below specifies that the following symbols are available symbols for Msg3 transmission if SFI is not configured.

1) Uplink symbols indicated by tdd-UL-DL-ConfigurationCommon, or by tdd-UL-DL-ConfigurationDedicated.
2) Flexible symbols indicated by tdd-UL-DL-ConfigurationCommon and tdd-UL-DL-ConfigurationDedicated if provided.

If UE is only provided by tdd-UL-DL-ConfigurationCommon, and a symbol is indicated as flexible symbol by tdd-UL-DL-ConfigurationCommon, it can be used for Msg3 transmission.

If UE is provided by both tdd-UL-DL-ConfigurationCommon and tdd-UL-DL-ConfigurationDedicated, and a symbol is indicated as flexible symbol by both tdd-UL-DL-ConfigurationCommon and tdd-UL-DL-ConfigurationDedicated if provided, the flexible symbol is available for Msg3 transmission.

TABLE 4

| |
|---|
| UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions. |
| If UE is not configured to monitor PDCCH for DCI format 2_0, for a set of symbols of a slot that are indicated as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE |
| - the UE receives PDSCH or CSI-RS in the set of symbols of the slot if the UE receives a corresponding indication by a DCI format |
| - the UE transmits PUSCH, PUCCH, PRACH, or SRS in the set of symbols of the slot if the UE receives a corresponding indication by a DCI format, a RAR UL grant, fallbackRAR UL grant, or successRAR |

Table 5 below specifies that the following symbols are not available for Msg3 transmission if SFI is not configured.

1) Downlink symbols indicated by tdd-UL-DL-ConfigurationCommon, or by tdd-UL-DL-ConfigurationDedicated
2) Symbols configured for SSB transmission Note that, a symbol for a CORESET for Type0-PDCCH CSS set indicated by pdcch-ConfigSIB1 in MIB can be indicated as flexible symbol by tdd-UL-DL-ConfigurationCommon and tdd-UL-DL-ConfigurationDedicated, which can be used for Msg3 transmission. In other words, as long as it is a flexible symbol indicated by tdd-UL-DL-ConfigurationCommon and tdd-UL-DL-ConfigurationDedicated, it can be used for Msg3 transmission.

TABLE 5

| |
|---|
| For a set of symbols of a slot that are indicated to UE as downlink by tdd-UL-DL-ConfigurationCommon, or tdd-UL-DL-ConfigurationDedicated, the UE does not transmit PUSCH, PUCCH, PRACH, or SRS when the PUSCH, PUCCH, PRACH, or SRS overlaps, even partially, with the set of symbols of the slot. |
| For operation on a single carrier in unpaired spectrum, for a set of symbols of a slot indicated to UE by ssb-PositionsInBurst in SIBI or ssb-PositionsInBurst in ServingCellConfigCommon, for reception of SS/PBCH blocks, the UE does not transmit PUSCH, PUCCH, PRACH in the slot if a transmission would overlap with any symbol from the set of symbols and the UE does not transmit SRS in the set of |

TABLE 5-continued

| |
|---|
| symbols of the slot. The UE does not expect the set of symbols of the slot to be indicated as uplink by tdd-UL-DL-ConfigurationCommon, or tdd-UL-DL-ConfigurationDedicated, when provided to the UE.<br>For a set of symbols of a slot indicated to UE by pdcch-ConfigSIBI in MIB for a CORESET for Type0-PDCCH CSS set, the UE does not expect the set of symbols to be indicated as uplink by tdd-UL-DL-ConfigurationCommon, or tdd-UL-DL-ConfigurationDedicated. |

Figure 22:
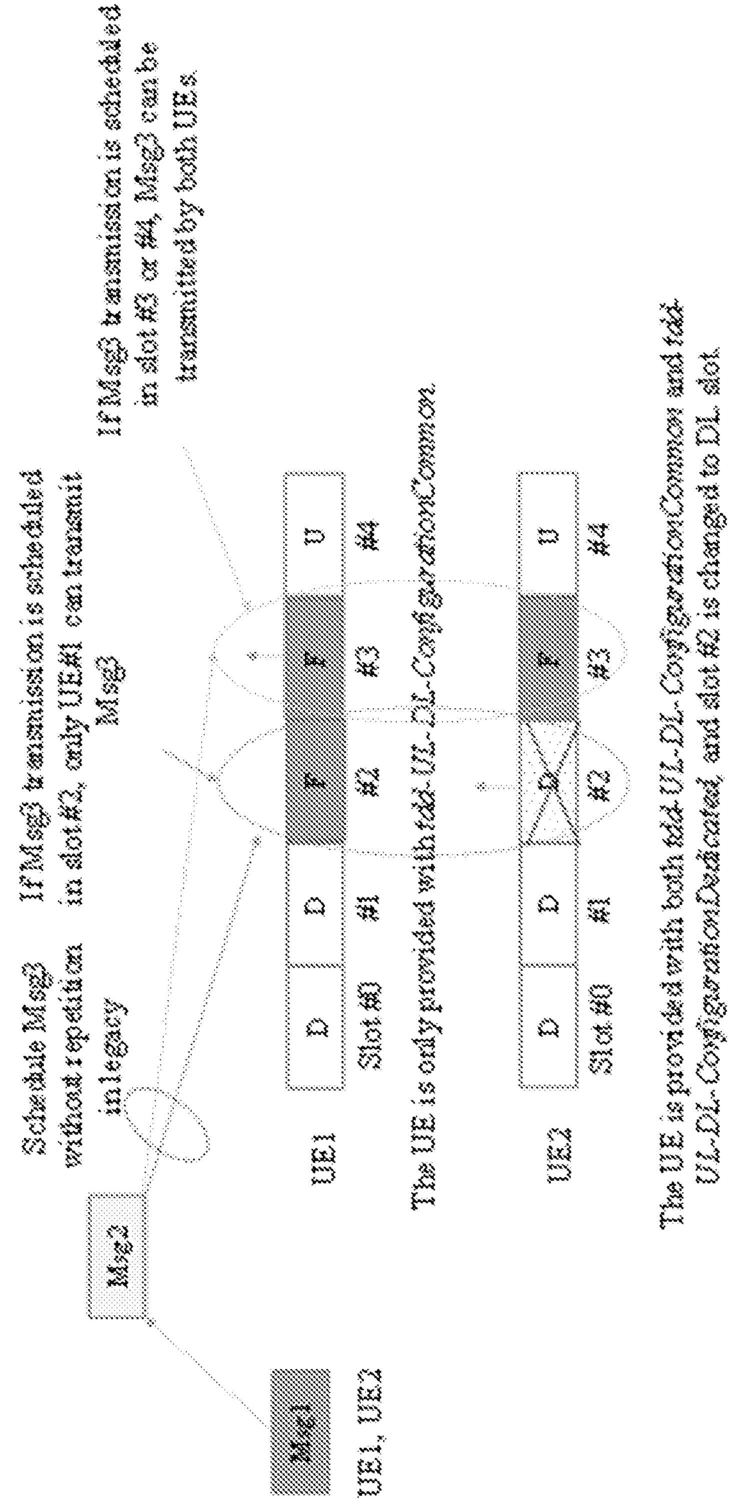
FIG. 22 shows an example of Msg3 scheduling.

FIG. 22 shows an example of Msg3 scheduling.

Based on above analysis, gNB shall try to avoid scheduling Msg3 transmission in flexible symbols configured only by tdd-UL-DL-ConfigurationCommon, given the flexible symbols may be changed to DL symbols for other UEs by tdd-UL-DL-ConfigurationDedicated. As shown in FIG. 22, UE #1 and UE #2 use the same preamble for Msg1 transmission. Both UEs would transmit Msg3 transmission if they can successfully decode the corresponding Msg2. If the Msg3 is scheduled in slot #2, only UE #1 can transmit Msg3. To avoid such a case, gNB can choose to schedule Msg3 in UL slot #3 or slot #4 by considering the UEs in RRC connect mode.

If Msg3 repetition is supported and flexible symbols can still be used for Msg3 transmission, it becomes difficult for gNB to keep the same occasions for Msg3 transmission among different UEs. The actual Msg3 transmission occasions are different for UEs in different RRC modes. It may be also different among RRC connect UEs if the dedicated RRC signaling for TDD configuration is different.

To avoid ambiguity at gNB side, it should make sure the delay of transmission of Msg3 repetition among different UEs should be the same. In this regard, the following options can be considered.

Option 1: Legacy transmission rules are reused with some configuration limitations on TDD configuration. More specifically, for a given UE, Msg3 repetition can be transmitted in UL symbols configured by tdd-UL-DL-ConfigurationCommon or tdd-UL-DL-ConfigurationDedicated, or flexible symbols configured by tdd-UL-DL-ConfigurationCommon and tdd-UL-DL-ConfigurationDedicated if provided. However, a flexible symbol configured by tdd-UL-DL-ConfigurationCommon is not allowed to change to DL symbols for some UEs while UL/flexible symbols for some other UEs by tdd-UL-DL-ConfigurationDedicated if provided. This is practically what has been deployed in the current networks to avoid DL/UL interference, while it may not be forward compatible.

However, the flexible symbols should be changed to the same direction among all UEs in the same serving cell. That is, a flexible symbol configured by tdd-UL-DL-ConfigurationCommon should be kept as flexible symbol or changed to DL symbol or UL symbol by tdd-UL-DL-ConfigurationDedicated if provided for all UEs in the same serving cell.

Option 2: Msg3 repetition can only be transmitted in UL symbols/slots that are configured by tdd-UL-DL-ConfigurationCommon. Then, regardless of whether UE is additionally configured with dedicated RRC signaling to change the direction of some symbols/slots or not, gNB has no ambiguity about where the Msg3 repetition would be transmitted. This may introduce additional latency for Msg3 repetition. In other words, this also restricts gNB to configure too much flexible symbols by tdd-UL-DL-ConfigurationCommon when Msg3 repetition is configured.

Option 3: A higher layer parameter configuring invalid symbols for Msg3 PUSCH repetition can be introduced. In some embodiments, the higher layer parameter is a cell specific signaling. In some embodiments, the higher layer parameter is only configured in SIB1. In some embodiments, the invalid symbols configured by a higher layer parameter are only applied to the flexible symbols configured by tdd-UL-DL-ConfigurationCommon. In some embodiments, the invalid symbols configured by higher layer parameter may be a subset of the flexible symbols configured by tdd-UL-DL-ConfigurationCommon. This is similar to the RRC configured invalid symbols (invalidSymbolPattern) introduced for PUSCH repetition type B.

If SFI is not configured, the legacy behavior for Msg3 transmission without repetition is reused when Msg3 repetition is enabled.

The following symbols are available symbols for transmission of Msg3 repetition: Uplink symbols indicated by tdd-UL-DL-ConfigurationCommon, or by tdd-UL-DL-ConfigurationDedicated; Flexible symbols indicated by tdd-UL-DL-ConfigurationCommon and tdd-UL-DL-ConfigurationDedicated if provided.

The following symbols are invalid symbols for transmission of Msg3 repetition: Downlink symbols indicated by tdd-UL-DL-ConfigurationCommon, or by tdd-UL-DL-ConfigurationDedicated; Symbols configured for SSB transmission.

If a Msg3 repetition overlaps with the invalid symbols, the UE doesn't transmit the repetition and it is not counted in the total number of repetitions for Msg3 transmission.

If SFI is not configured, only uplink symbols indicated by tdd-UL-DL-ConfigurationCommon, or tdd-UL-DL-ConfigurationDedicated are available symbols for transmission of Msg3 repetition.

If SFI is not configured, downlink or flexible symbols indicated by tdd-UL-DL-ConfigurationCommon or tdd-UL-DL-ConfigurationDedicated, or symbols configured for SSB transmission are invalid symbols for transmission of Msg3 repetition.

If a Msg3 repetition overlaps with the invalid symbols, the UE doesn't transmit the repetition and it is not counted in the total number of repetitions for Msg3 transmission

Example 3

If dynamic SFI is configured, the Rel-15/16 legacy UE behavior for collision handling of Msg3 transmission is summarized below.

If dynamic SFI is configured, UE does not expect collision between Msg3 transmission and SFI indication.

If dynamic SFI is configured and the DCI format 2_0 is detected by UE, the flexible symbols indicated by the DCI format 2_0 are available symbols for Msg3 transmission.

If dynamic SFI is configured and while DCI format 2_0 is not detected by UE, the flexible symbols indicated by tdd-UL-DL-ConfigurationCommon, and tdd-UL-DL-ConfigurationDedicated if provided are available symbols for Msg3 transmission.

TABLE 6

| |
|---|
| For a set of symbols of a slot, UE does not expect to detect a DCI format 2 0 with an SFI-index field value indicating the set of symbols in the slot as downlink and to detect a DCI format, a RAR UL grant, fallbackRAR UL grant, or successRAR indicating to the UE to transmit PUSCH, PUCCH, PRACH, or SRS in the set of symbols of the slot. |
| For a set of symbols of a slot indicated to UE as flexible by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the UE, and if the UE detects a DCI format 2_0 providing a format for the slot using a slot format value other than 255 |
| - if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot |
| - a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot |
| For a set of symbols of a slot that are indicated as flexible by tdd-UL-DL-ConfigurationCommon, and tdd-UL-DL-ConfigurationDedicated if provided, or when tdd-UL-DL-ConfigurationCommon, and tdd-UL-DL-ConfigurationDedicated are not provided to the UE, and if the UE does not detect a DCI format 2_0 providing a slot format for the slot |
| - the UE receives PDSCH or CSI-RS in the set of symbols of the slot if the UE receives a corresponding indication by a DCI format |
| - the UE transmits PUSCH, PUCCH, PRACH, or SRS in the set of symbols of the slot if the UE receives a corresponding indication by a DCI format, a RAR UL grant, fallbackRAR UL grant, or successRAR |

If flexible symbols indicated by SFI can be used for Msg3 repetition, different UEs may postpone different number of Msg3 repetitions and gNB cannot be aware of this. To avoid ambiguity on whether the UE actually transmits Msg3 repetition, the flexible symbols indicated by SFI are not used for transmission of Msg3 repetition.

If SFI is configured, regardless the DCI format 2_0 for SFI indication is detected by the UE or not, the flexible symbols are invalid symbols for transmission of Msg3 repetition.

If a Msg3 repetition overlaps with the invalid symbols, the UE doesn't transmit the repetition and it is counted in the total number of repetitions for Msg3 transmission. If dynamic SFI is configured and the DCI format 2_0 is detected by UE, the flexible symbols indicated by the DCI format 2_0 are invalid symbols for Msg3 repetition.

If dynamic SFI is configured while DCI format 2_0 is not detected by UE, the flexible symbols indicated by tdd-UL-DL-ConfigurationCommon, and tdd-UL-DL-Configuration-Dedicated, if provided, are available symbols for Msg3 repetition.

In some embodiments, Msg3 PUSCH repetition cannot be cancelled by UL cancellation indication (CI).

FIGS. 23A-23D show example configurations of actual time domain window, nominal time domain window, and bundle.

Figure 23A:
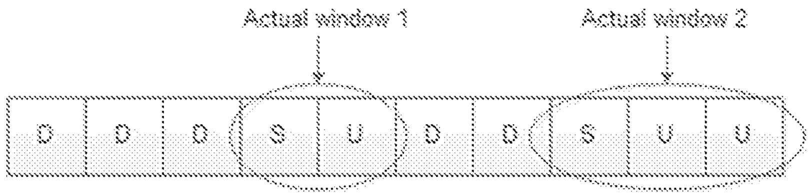
FIGS. 23A-23D show example configurations of actual time domain window, nominal time domain window, and bundle.

In some implementations, as shown in FIG. 23A, the UE capability is reported as 10 slots, and the UE can maintain phase continuity. Upon receipt of the UE capability, the gNB configures the nominal time domain window such that its size is set to 8 and confirms the starting point of the nominal time domain window, for example, according to Scheme 3 or Scheme 1 discussed above, and configures an actual time domain window 1 as 2 slots and an actual time domain window 2 as 3 slots.

Figure 23B:
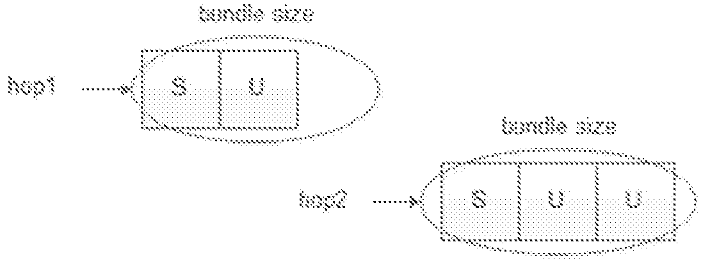

FIG. 23B shows the bundle size is 3, the actual available bundle size in the actual time domain window 1 is 2, and the frequency hopping.

Figure 23C:
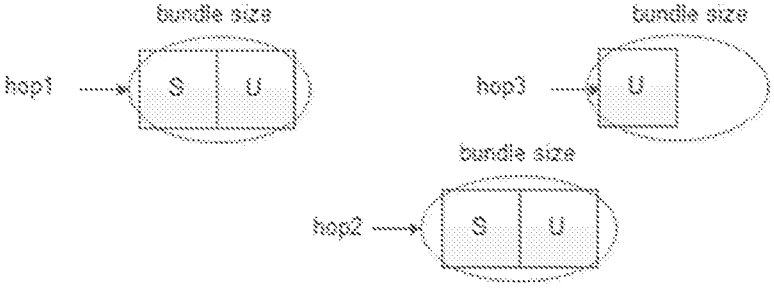

FIG. 23C shows the bundle size is 2, the actual window 2 can be divided into 2 hops, where hop3 and hop1 have the same frequency domain position, and the frequency hopping.

Figure 23D:
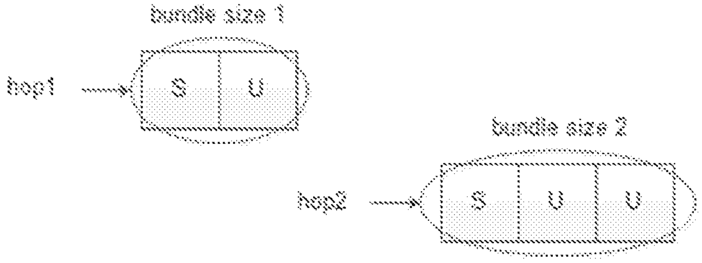

FIG. 23D shows two bundles that have different sizes, and each bundle can be less than or equal to the corresponding actual time domain window.

Figure 24:
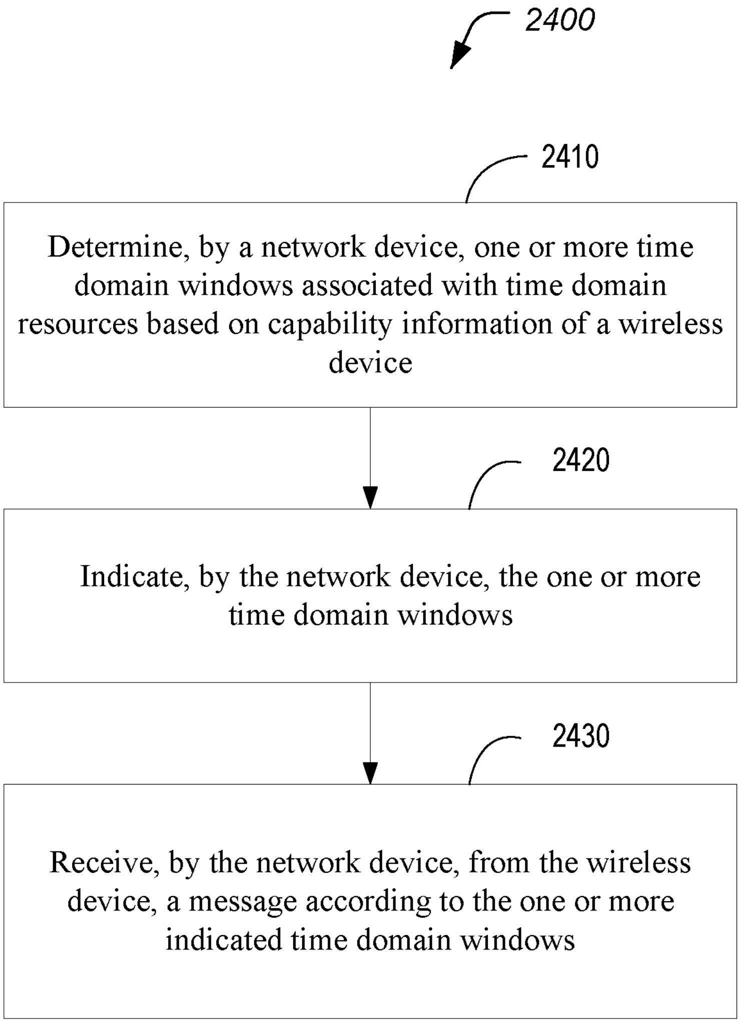
FIG. 24 shows an example of a wireless communication method based on some embodiments of the disclosed technology.

FIG. 24 shows an example of a wireless communication method based on some embodiments of the disclosed technology.

In some embodiments of the disclosed technology, a wireless communication method 2400 includes, at 2410, determining, by a network device, one or more time domain windows associated with time domain resources based on capability information of a wireless device, at 2420, indicating, by the network device, the one or more time domain windows, and at 2430, receiving, by the network device, from the wireless device, a message according to the one or more indicated time domain windows.

Figure 25:
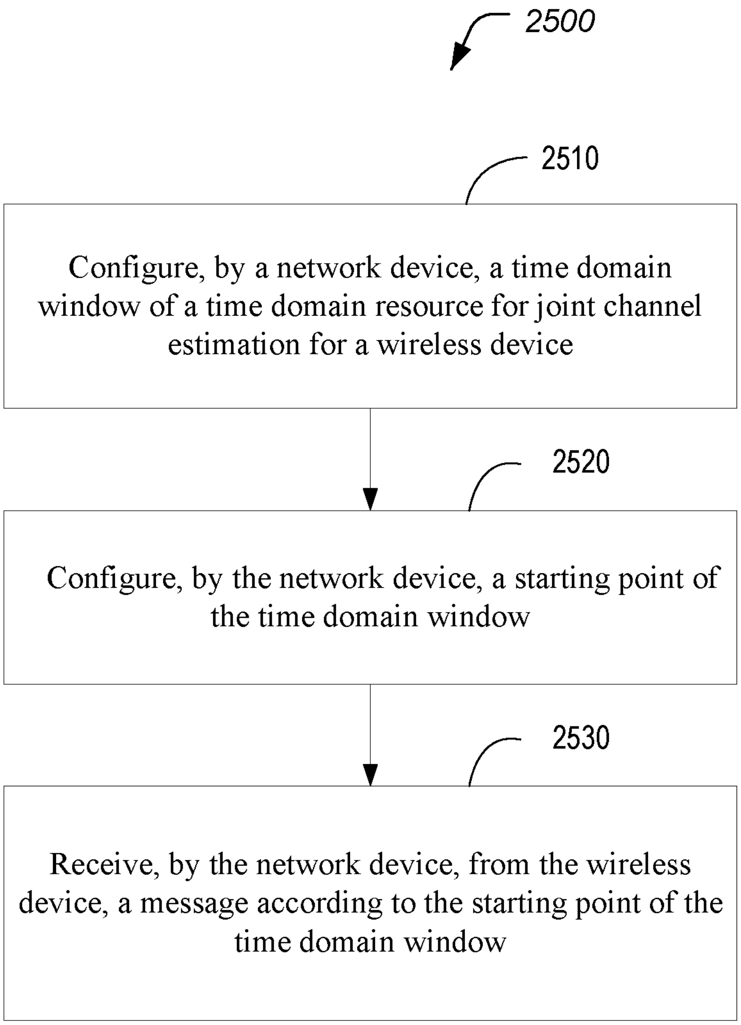
FIG. 25 shows another example of a wireless communication method based on some embodiments of the disclosed technology.

FIG. 25 shows another example of a wireless communication method based on some embodiments of the disclosed technology.

In some embodiments of the disclosed technology, a wireless communication method 2500 includes, at 2510, configuring, by a network device, a time domain window of a time domain resource for joint channel estimation for a wireless device, at 2520, configuring, by the network device, a starting point of the time domain window, and at 2530, receiving, by the network device, from the wireless device, a message according to the starting point of the time domain window.

Figure 26:
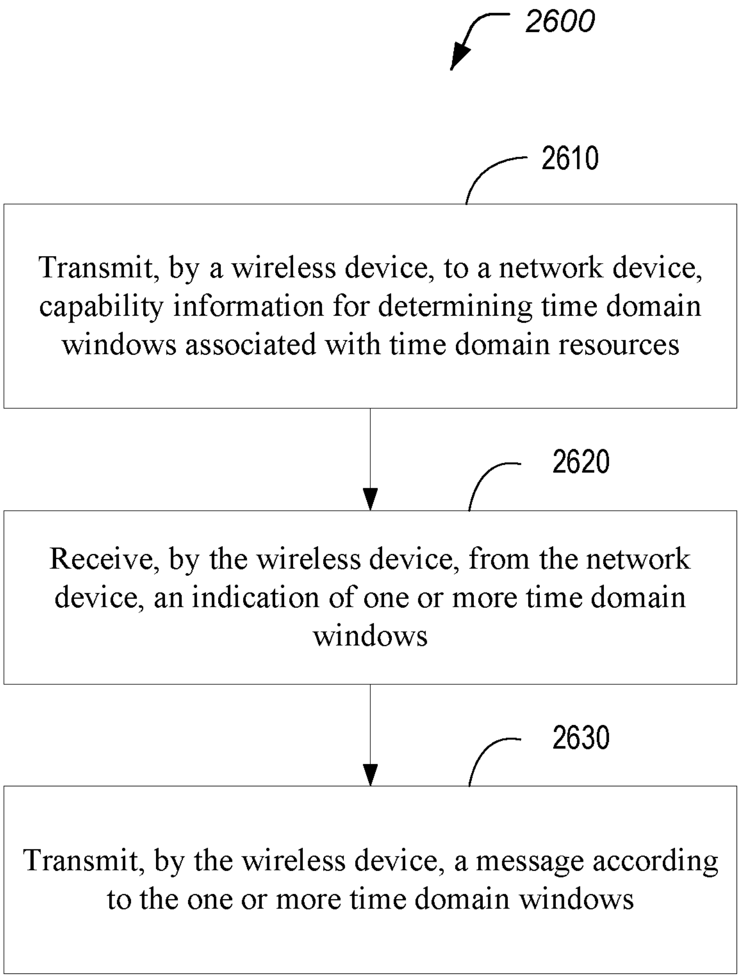
FIG. 26 shows another example of a wireless communication method based on some embodiments of the disclosed technology.

FIG. 26 shows another example of a wireless communication method based on some embodiments of the disclosed technology.

In some embodiments of the disclosed technology, a wireless communication method 2600 includes, at 2610, transmitting, by a wireless device, to a network device, capability information for determining time domain windows associated with time domain resources, at 2620, receiving, by the wireless device, from the network device, an indication of one or more time domain windows, and at 2630, transmitting, by the wireless device, a message according to the one or more time domain windows.

Figure 27:
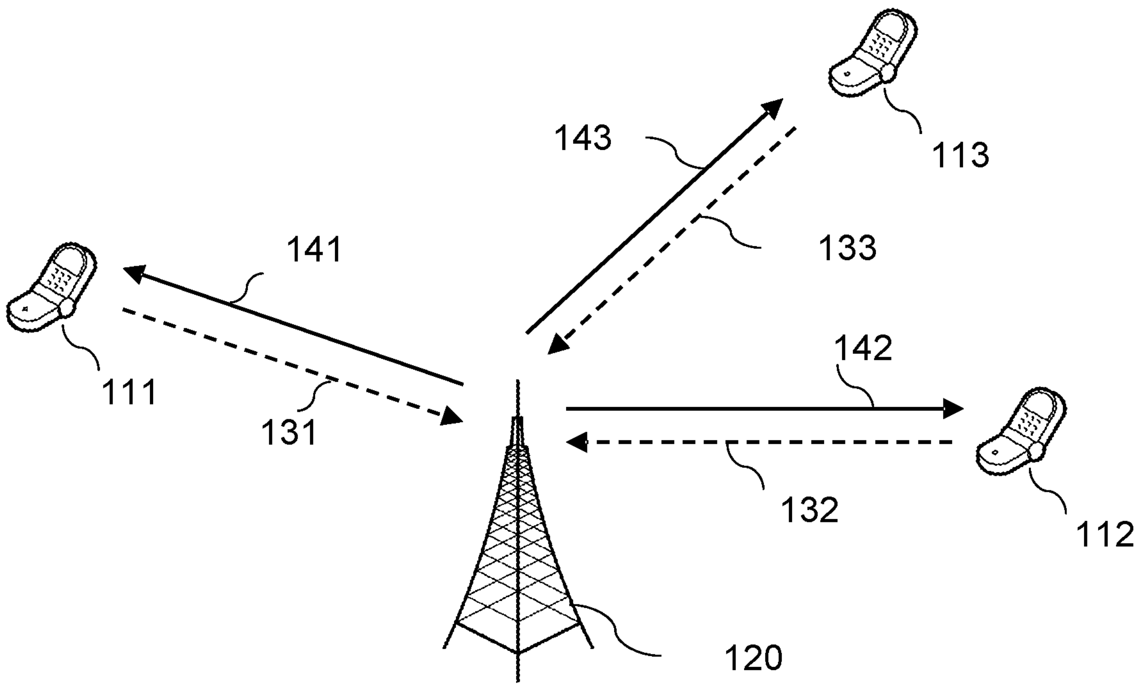
FIG. 27 shows an example of a wireless communication system.

FIG. 27 shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

Figure 28:
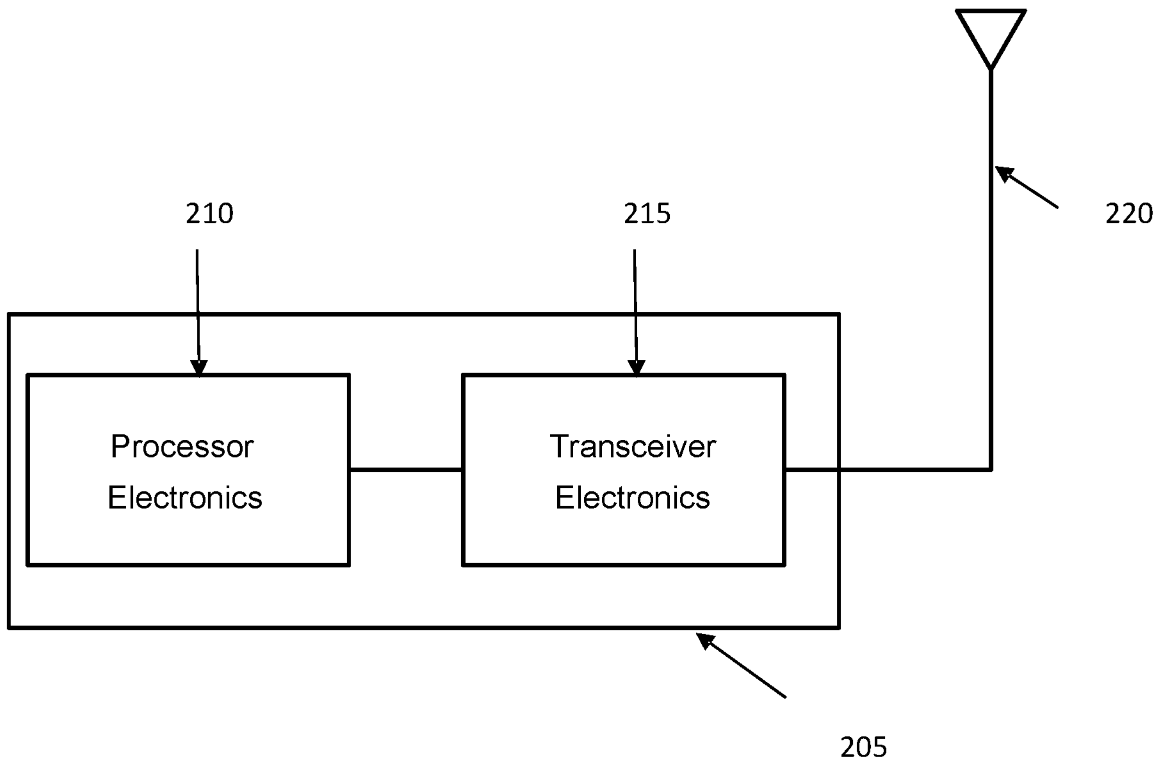
FIG. 28 is a block diagram representation of a portion of a radio station based on one or more embodiments of the disclosed technology can be applied.

FIG. 28 is a block diagram representation of a portion of a radio station based on one or more embodiments of the disclosed technology can be applied. A radio station 205 such as a base station or a wireless device (or UE) can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the radio station 205.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network device includes a base station including a next generation Node B (gNB), enhanced Node B (eNB), or any other device that performs as a base station. A resource range may refer to a range of time-frequency resources or blocks.

Clause 1. A method for wireless communication, comprising: determining, by a network device, one or more time domain windows associated with time domain resources based on capability information of a wireless device; indicating, by the network device, the one or more time domain windows; and receiving, by the network device, from the wireless device, a message according to the one or more indicated time domain windows.

Clause 2. The method of clause 1, wherein the one or more time domain windows include at least one of a time domain window size or a starting point of a time domain window.

Clause 3. The method of clause 2, wherein the time domain window size includes at least one of a nominal time domain window size, an actual time domain window size, or a bundle size.

Clause 4. The method of clause 1, wherein the capability information includes a maximum time domain window size supported by the wireless device.

Clause 5. The method of clause 2, wherein the time domain window size is determined based on at least one of a number of repetitions, a number of slots, or a number of symbols.

Clause 6. The method of clause 2, wherein the time domain window size includes at least one nominal time domain window size, at least one actual time domain window size, and at least one bundle size.

Clause 7. The method of clause 6, wherein a frequency hopping is performed based on the at least one actual time domain window size without the at least one bundle size.

Clause 8. The method of clause 6, wherein the at least one bundle size is determined based on one of the at least one actual time domain window size that is larger or smaller than another actual time domain window size.

Clause 9. The method of clause 6, wherein the at least one bundle size is less than or equal to a corresponding actual time domain window size.

Clause 10. The method of clause 6, wherein the at least one actual time domain window size and the at least one bundle size are less than or equal to the at least one nominal time domain window size.

Clause 11. The method of clause 2, wherein the time domain window size includes at least one nominal time domain window size and at least one bundle size.

Clause 12. The method of clause 11, wherein the at least one bundle size is half the at least one nominal time domain window size.

Clause 13. The method of clause 11, wherein the wireless device determines an actual time domain window and a corresponding actual time domain window size based on: whether physical uplink shared channel (PUSCH) transmissions are consecutive transmissions; whether a frequency domain resource block occupied by PUSCH does not change; whether PUSCH phase continuity remains unchanged; whether PUSCH power control parameters do not change; whether a PUSCH timing advance remains unchanged; whether a PUSCH transmission precoding remains unchanged; whether a carrier aggregation (CA) uplink switching function does not perform a dynamic switching; whether there is a dynamic switching with respect to a bandwidth part (BWP); whether there is a dynamic switching between a normal uplink (NUL) and a supplementary uplink (SUL); or whether a non-consecutive time domain length is greater than a predetermined number of symbols, slots or repetitions.

Clause 14. The method of clause 13, wherein a frequency hopping is performed by the wireless device in the actual time domain window according to the at least one bundle size.

Clause 15. The method of clause 11, wherein the at least one bundle size is less than or equal to a corresponding nominal time domain window size.

Clause 16. The method of clause 2, wherein the time domain window size includes at least one nominal time domain window size, and wherein the at least one nominal time domain window size is used as a bundle for frequency hopping.

Clause 17. A method for wireless communication, comprising: configuring, by a network device, a time domain window of a time domain resource for joint channel estimation for a wireless device; configuring, by the network device, a starting point of the time domain window; and receiving, by the network device, from the wireless device, a message according to the starting point of the time domain window.

Clause 18. The method of clause 17, wherein the time domain resource includes consecutive physical resources or non-consecutive physical resources.

Clause 19. The method of clause 17, wherein the starting point of the time domain window is a last symbol of an uplink grant for physical uplink shared channel (PUSCH) transmission.

Clause 20. The method of clause 17, wherein the starting point of the time domain window is a first symbol within a period for each PUSCH or physical uplink control channel (PUCCH).

Clause 21. The method of clause 17, wherein the starting point of the time domain window is a starting point of each wireless frame.

Clause 22. The method of clause 17, wherein an offset value is configured for the wireless device to allow a time domain window sliding.

Clause 23. The method of clause 17, wherein the time domain window includes at least one of an actual time domain window or a nominal time domain window.

Clause 24. The method of any of clauses 17-23, wherein the time domain window is restarted upon occurrence of a predetermined event including at least one of: consecutive PUSCH transmission; non-consecutive PUSCH transmission; a frequency domain resource block occupied by PUSCH changes; changes in PUSCH phase continuity; changes in PUSCH power control parameters; changes in PUSCH timing advance; changes in the PUSCH transmission precoding; dynamic switching by carrier aggregation (CA) uplink switching; dynamic switching of bandwidth part (BWP); dynamic switching between a normal uplink (NUL) and a supplementary uplink (SUL); or non-consecutive time domain length is greater than a predetermined number of symbols, slots or repetitions.

Clause 25. A method for wireless communication, comprising: transmitting, by a wireless device, to a network device, capability information for determining time domain windows associated with time domain resources; receiving, by the wireless device, from the network device, an indication of one or more time domain windows; and transmitting, by the wireless device, a message according to the one or more time domain windows.

Clause 26. The method of clause 25, wherein the capability information includes a maximum time domain window size supported by the wireless device, and wherein the capability information is used to determine at least one of a time domain window size or a starting point of a time domain window associated with the one or more time domain windows.

Clause 27. The method of clause 26, wherein the time domain window size includes at least one of a nominal time domain window size, an actual time domain window size, or a bundle size.

Clause 28. The method of clause 26, wherein the time domain window size is determined based on at least one of a number of repetitions, a number of slots, or a number of symbols.

Clause 29. An apparatus for wireless communication, comprising a memory and a processor, wherein the processor reads code from the memory and implements a method recited in any of clauses 1 to 28.

Clause 30. A computer readable program storage medium having code stored thereon, the code, when executed by a processor, causing the processor to implement a method recited in any of clauses 1 to 28.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

determining, by a network device, one or more nominal time domain windows associated with time domain resources based on capability information of a wireless device, wherein the capability information includes a maximum time domain window size supported by the wireless device, wherein the one or more nominal time domain windows include at least one of a nominal time domain window size or a starting point of a nominal time domain window, wherein the nominal time domain window size allows the wireless device to guarantee phase continuity and the nominal time domain window size is less than or equal to the maximum time domain window size;

indicating, by the network device, the one or more nominal time domain windows; and receiving, by the network device, from the wireless device, a message according to the one or more indicated time domain windows, wherein an actual time domain window size of an actual time domain window is determined by the wireless device within the nominal time domain window to maintain the phase continuity and the actual time domain window is restarted upon occurrence of a predetermined event that includes changes in power control parameters of physical uplink shared channel (PUSCH), timing advance of the PUSCH, transmission precoding of the PUSCH, or dynamic switching of a bandwidth part (BWP), wherein when only a nominal time domain window is configured and an inter-slot hopping is enabled, the nominal time domain window size is equal to a bundle size for the inter-slot hopping that is performed between nominal time windows.

2. The method of claim 1, wherein the nominal time domain window size is determined based on at least one of a number of repetitions, a number of slots, or a number of symbols.

3. The method of claim 1, wherein the nominal time domain window size is notified through at least one of Radio Resource Control (RRC) signaling, Medium Access Control Element (MAC-CE) or Downlink Control Information (DCI).

4. A method for wireless communication, comprising:

transmitting, by a wireless device, to a network device, capability information for determining time domain windows associated with time domain resources, wherein the capability information includes a maximum time domain window size supported by the wireless device;

receiving, by the wireless device, from the network device, an indication of one or more nominal time domain windows, wherein the one or more nominal time domain windows include at least one of a nominal time domain window size or a starting point of a nominal time domain window, wherein the nominal time domain window size allows the wireless device to guarantee phase continuity and the nominal time domain window size is less than or equal to the maximum time domain window size;

determining, by the wireless device, an actual time domain window size of an actual time domain window in the nominal time domain window to maintain the phase continuity; and transmitting, by the wireless device, a message according to the one or more nominal time domain windows, wherein the actual time domain window is restarted upon occurrence of a predetermined event that includes changes in power control parameters of physical uplink shared channel (PUSCH), timing advance of the PUSCH, transmission precoding of the PUSCH, or dynamic switching of a bandwidth part (BWP), wherein when only a nominal time domain window is configured and an inter-slot hopping is enabled, the nominal time domain window size is equal to a bundle size for the inter-slot hopping that is performed between nominal time windows.

5. The method of claim 4, wherein the nominal time domain window size of is determined based on at least one of a number of repetitions, a number of slots, or a number of symbols.

6. The method of claim 4, wherein the nominal time domain window size is notified through at least one of Radio Resource Control (RRC) signaling, Medium Access Control Element (MAC-CE) or Downlink Control Information (DCI).

7. The method of claim 4, wherein the wireless device determines the actual time domain window size in the nominal time domain window according to at least one of following: a consecutive PUSCH transmission; a frequency domain resource block occupied by a PUSCH which does not change; a PUSCH phase continuity which remains unchanged; PUSCH power control parameters which do not change; PUSCH timing advance which remains unchanged; PUSCH transmission precoding which remains unchanged; carrier aggregation (CA) uplink switching which does not perform dynamic switching; BWP which does not dynamically switch; a normal uplink (NUL) and a supplementary uplink (SUL) which do not dynamically switch; or a physical non-consecutive time domain whose length is not greater than K, K being configurable or predefined.

* * * * *